US011879422B1

(12) United States Patent
Gill

(10) Patent No.: US 11,879,422 B1
(45) Date of Patent: Jan. 23, 2024

(54) BUOYANCY FORCE ENERGY SYSTEM (BFES)

(71) Applicant: Daniel Gill, Appleton, WI (US)

(72) Inventor: Daniel Gill, Appleton, WI (US)

( * ) Notice: Subject to any disclaimer, the term of this patent is extended or adjusted under 35 U.S.C. 154(b) by 24 days.

(21) Appl. No.: 17/681,327

(22) Filed: Feb. 25, 2022

Related U.S. Application Data

(60) Provisional application No. 63/154,705, filed on Feb. 27, 2021.

(51) Int. Cl.
*F03B 17/00* (2006.01)
*F03B 17/02* (2006.01)

(52) U.S. Cl.
CPC .................................. *F03B 17/025* (2013.01)

(58) Field of Classification Search
CPC ..................................................... F03B 17/025
USPC ........................................... 60/496, 495, 649
See application file for complete search history.

(56) References Cited

U.S. PATENT DOCUMENTS 8,667,798 B2 * 3/2014 Hopper .................... F03B 17/02 290/43
8,910,475 B2 * 12/2014 Chiu ..................... F03B 17/025 60/495
2011/0260471 A1 * 10/2011 Ham ..................... F03B 13/262 290/55
2017/0089318 A1 * 3/2017 Aldosari ............... F03B 17/025
2018/0051668 A1 * 2/2018 Fernandez .............. F04D 25/02

FOREIGN PATENT DOCUMENTS

WO WO-2015193873 A2 * 12/2015 .............. F03B 13/06

* cited by examiner

*Primary Examiner* — Julio C. Gonzalez
(74) *Attorney, Agent, or Firm* — Foley & Lardner LLP

(57) ABSTRACT

Disclosed herein are systems and methods for generating energy from a container configured to be fully submerged in a liquid and containing differing volumes of gas in order to alternatively ascend and descend through the liquid in order to rotate a drum spool connected to the container by a cable hose that unwinds from the drum spool as the container ascends, and winds as the cable descends. The rotational energy of the drum spool may thus be harvested.

21 Claims, 15 Drawing Sheets

BUOYANCY FORCE ENERGY SYSTEM (BFES)

CROSS-REFERENCE TO RELATED APPLICATIONS

This application claims the benefit of and priority to U.S. Patent Application No. 63/154,705, filed on Feb. 27, 2021, the contents of which are incorporated herein by reference in their entirety.

FIELD OF INVENTION

The invention relates to the field of energy generation. Particularly, this invention relates to harvesting energy from a rotation associated with the ascension of a buoyant container.

BACKGROUND OF THE INVENTION

One of the challenges facing modern civilization is to find a cost efficient, non-polluting source of renewable energy. Among the sources of renewable energy showing great promise are those devices powered by geothermal heat, wind, solar, tides, waves and water currents. At present, the majority of these sources are too costly to effectively compete with polluting fossil fuels but that gap is narrowing quickly as new technologies arise.

Many years ago, as a youth, I would enjoy swimming in a pool and playing with a basketball. One of the things I would enjoy doing with the basketball would be to hold it underwater and then release it, upon which it would rise rapidly to the surface, break the water and fly up into the air. This is an example of Archimedes Principle regarding the law of buoyancy which states basically that: "Any object, or portion of an object, submerged in a fluid at rest is acted on by an upward, or buoyant, force, the magnitude of which is equal to the weight of the fluid displaced by the object, with the volume of fluid displaced being equal to the volume of the object, or portion of the object, submerged." This principle is supportive of the current invention.

SUMMARY OF THE INVENTION

Embodiments of the invention may include an electrical energy generating device having at least one, but preferably at least two or more drum spools with each drum spool having an, impervious to leakage, and made of non-stretching, but flexible material, inflatable energy bladder attached to each drum spool via at least one, but preferably more than one, impervious to leakage, non-stretching air hose(s), that uses Archimedes Principle acting upon the device's inflated air bladder having its locking mechanism disengaged, allowing the inflated bladder to rise in the water held in a container, a structure built for the purpose of containing the device's water, or in open water such as a lake. Where the water is held in a container or structure, that structure may be sealed so as to prevent evaporation of the water held within and with the air pumped out of the container or structure so as to create a vacuum and minimize air pressure within the container or structure. Where there is air in the container or structure containing water, that air may be heated so as to prevent the water from freezing in colder climates.

The force of the inflated and rising energy bladder generated by Archimedes Principle causes the device's inflated, unlocked and rising in the water, energy bladder (energy bladder A) to pull its cable air hoses, which are wound around and connected to its drum spool, upward and unwind from its drum spool. The drum spool is connected by gearing to an electric power generator rotor that causes the rotor to rotate around its stator, generating electricity, as the drum spool turns because of the upward force of the rising, inflated energy bladder in the water being sufficient to power the electrical generator. The unwinding of the drum spool is with sufficient force as a result of the size of its inflated energy bladder being relative to optimally turn the electric generator's rotor to cause the device to create electricity. A portion of the amount of electrical energy generated is used to put enough of a charge in an electric storage battery to power the device's motors to lock and unlock the drum spool, power to open and close the air pump air valve, power the air pump to inflate and deflate the energy bladder, turn the drum spool in order to rewind an unwound air hose back upon its drum spool, returning the deflated energy bladder to its starting point in the process, lock the deflated energy bladder at its starting point, inflate the energy bladder and then unlock the energy bladder's drum spool in order to allow the inflated energy bladder to rise in the water according to Archimedes Principle and repeat the cycle. Once an energy bladder has reached its optimal rise in the water the pump's air valve is opened by a motor triggered by the device's electronic controller's timer and the pump begins to deflate the bladder. Deflation of that energy bladder is aided greatly by water pressure upon the inflated energy bladder from water displaced by the energy bladder according to Archimedes Principle as well.

The air from the deflated bladder initially escapes into its air reservoir when the pump's air valve is opened and the inflated energy bladder is subjected to force according to Archimedes Principle and then the inflated energy bladder's air is pumped into an separate air reservoir or stored within the drum spool's, hermetically sealed, drum, the interior of which is sufficient of sufficient volume capacity to store the air from the deflated energy bladder, in which case the drum spool needs a valve and motor. Pumping the bladder's air into a reservoir for storage and from the reservoir back into the bladder when it is time to inflate the energy bladder creates much less noise pollution than if one were to simply pump the bladder's air out into the atmosphere and back into the deflated bladder from the atmosphere because the pump can be contained in a sound proof housing. Using air reservoirs also allows for reusing the same air when in an airless or minimal air environment such as on the moon. In accordance with Archimedes Principle, it takes less energy to deflate the energy bladder than it does to inflate the energy bladder once it has been locked into its start position. For this reason the air from the deflating energy bladder is compressed into its reservoir in order that the stored energy of the compressed air in the reservoir adds energy to the force necessary to re-inflate the energy bladder.

With the energy bladder now deflated, the energy bladder air hose, with its deflated energy bladder, is fairly easily wound up upon the, hermetically sealed, drum of its drum spool, anchored at the bottom of the water filled container, structure or etc. as the drum spool's gearing is powered in reverse by the drum spool's electrical motor in accordance with Archimedes Principle because the amount of water displaced by the deflated bladder is a fraction of the amount of water the energy bladder displaced with the energy bladder inflated, its drum spool unlocked and the energy bladder rising in rising in the water.

Drum gearing to the electric generator's rotor freewheels and doesn't power the generator's rotor when the gearing is powered in reverse and the drum spool is being rotated in reverse so as to rewind the air hose and retract the deflated energy bladder to its starting point. This allows for a second energy bladder's, energy bladder B's, rise in the water to power its gearing to power the same electric generator's rotor in the same direction as the first inflated energy bladder when the first energy bladder is in its rising mode as a result of that energy bladder's gearing also having freewheel gears. The drum rotation motor's freewheel gear freewheels when the energy bladder is rising so as to not have the added resistance of the motor as well.

With both BFES embodiments, energy bladder A's air hose is rewound and the deflated energy bladder back to its starting point, the device's electronic controller signals a drum spool lock motor to engage the device's first energy bladder's drum spool lock so that the drum cannot unwind as energy bladder A is being, once again, optimally inflated. The electronic controller then signals the device's electric air pump motor to re-inflate the energy bladder to its optimum inflated size. Once the bladder is optimally inflated the electronic controller signals the pump motor to shut down and close its air valve and then the drum spool lock motor to unlock the drum spool allowing the, now inflated, first energy bladder's rise in the water to power the electric generator to create electricity in the process and repeat the cycle.

The same electric generator's rotor is connected by gearing to a second energy bladder's, energy bladder B's, drum spool's gearing. When energy bladder B has its drum spool unlocked the inflated that energy bladder rises in the water according to Archimedes Principle and turns the air hose drum spool as the bladder's air hose is unwound. The drum spool's gearing powers the same rotor of the electric generator that energy bladder A powered when it was in its rising mode. Energy bladder B is unlocked and begins its rise in the water at the same time as energy bladder A reaches its optimum rise in the water and begins to be reset and vice versa. When energy bladder B is being reset and having its air hose rewound back upon its drum spool, the gearing powering the energy bladder A's drum spool to the device's common rotor of the electric generator freewheels and vice versa as well.

The time it takes to reset the first energy bladder should equal the time it takes for the second energy bladder to rise in the water and vice versa in order to produce a consistent flow of electricity beyond the amount of energy it takes to power the generator to create electricity for resetting the energy bladder. More than one of the two energy bladder devices can be timed to ensure that there is a consistent amount of electrical energy generated for sale to the grid all the time. The amount of energy in excess of the amount of energy it takes to make the device work, which should be quite substantial, is then sold to the grid, directly to corporations and individual residences through the grid or directly to customers that lease the device, have it on their property and are charged a product, delivery and set up charge and are then charged by the amount of electricity that is consumed and not grounded out.

The amount of energy the device will put out to power its electric generator is determined by several factors including the size of the optimally inflated energy bladder, the distance the inflated energy bladder travels as it rises to the end of its rise in the water, how much water the rising energy bladder displaces in total, the speed at which the energy bladder travels, the amount of turbulence in the water, if any, conflicting forces, such as tidal forces, if any, and the depth in the water at the energy bladder's starting point. As a rule of thumb, the greater the distance the inflated energy bladder rises in a given period of time and the greater the efficiency of the resetting of the energy bladders and the electrical generators, the more energy in excess of what is needed to cause the device to be reset and power the generator is generated. All is the same with the Energy Drum Embodiment of the BFES as it is for the Energy Bladder Embodiment except the manner of expelling air by flooding the energy drum by flooding with water rather than having the air pumped out of the Energy Bladder Embodiment via the air pump. The Energy Drum is, however, filled by with air pumped into the Energy Drum's Embodiment's energy drum via the Energy Drum Embodiment's air pump.

If one wants to reset the device's energy bladders or energy drums for a continuous cycle of electrical energy production without using electric battery powered motors, except for a small battery that is charged by the device's generator that is used to power the electronic controller and motors that open and close the pump's air valve, and still generate energy to sell to the grid, etc., the energy bladder or energy drum spool's gearing can be configured so that all the functions that are performed by electric motors, including inflating and deflating energy bladders, rewinding air hoses and locking and unlocking drum spool locks etc., can be powered mechanically with one rising energy bladder or energy drum directly powering the resetting of the opposite energy bladder or energy drum and vice versa, with the energy produced in excess of that required for resetting the energy bladders or energy drums and power the electric generator, creating electricity that can be sold.

If one wants to neither reset energy bladders using electric power nor generate electricity for sale to the grid or other purposes, the device may power gearing to provide mechanical energy beyond that required for resetting the device for whatever purposes deemed appropriate, such as pumping vast amounts of water and lifting that water using the Archimedes Screw, or other means, from one location to another, conveying large amounts of anything from one location to another or filling compressed air reservoirs so that the energy stored in the compressed air reservoirs can be released to power compressed air vehicles, etc. some greater distance from where the device is generating mechanical energy.

The device may be either of the flexible BFES energy bladder embodiment, the material of which does not expand like a rubber balloon but fills with air to create the bladder's optimal shape, or of the BFES energy drum embodiment types where an optimally designed, hydrodynamic energy drum that can be flooded with water for rewinding when resetting and have its drum filled with compressed air when the energy drum is locked into position at its starting point, blowing the water from the drum like a submarine blows its ballast tanks when the submersible craft's captain wants to surface, prior to its drum spool lock being unlocked in order to allow the energy drum to rise in the water according to Archimedes Principle and generate energy by the unwinding of its air hose and turning of its air hose drum spool, thereby powering its gearing in the process.

If air from the air filled drum is exhausted into the water as opposed to a reservoir and air to fill the energy drum is pumped from the atmosphere instead of an air reservoir an extra benefit of the device is that it aerates the surrounding water which benefits the nearby underwater flora and fauna by putting more air in the water. The bottom part of the energy bladder/drum near where the air hose connects to the energy bladder/drum may be connected to a guide rod wheel axle the wheels of which fit within two vertical guide tracks secured to the structure or by cables and/or underwater supporting structure to allow the energy bladder/drum to rise and descend perfectly vertically in spite of turbulence or other forces in the water allowing the device to propel, or be, a vessel.

The energy bladder air hose drum spool and the energy drum air hose and electric power cable hose drum spool, have hose guides, similar to using one thumb on the spool of a fishing bait casting reel to keep the fishing line evenly diffused on the spool drum in lieu of a casting reel with a line guide system, to wind the air and power cable hoses evenly on the drum spool and prevent tangling. Where used in lieu of a main electric storage battery, the mechanical energy storage system's cables have a similar cable guide as well. The device, in many embodiments of the invention, can also be manually reset mechanically by a hand crank, etc. for periodic maintenance and repair if necessary.

Mechanical Energy Storage System

In lieu of an electric storage battery, and using a less powerful electric generator, a portion of the force generated by the inflated and rising energy bladder can be used to power the device's simple, mechanical energy storage system. Embodiments of the simple mechanical energy storage system may include an, optimally designed, concrete weight, relative in size to the amount of energy to be stored, and having cable connection D rings optimally attached at the top of the weight having cables attached that attach to a master cable. The master cable is run through a pulley secured in a safe, out of the way, location centered at one side of the BFES structure's service corridor's top, and back down to its cable drum spool and secured. One of the weight cable drum spool's flanges serves as the system's ratchet wheel because of having ratchet gear teeth that correspond to the pawl of the energy storage system's pawl and the opposite drum spool's flange has gear teeth that correspond to the gearing powering the system's electric generator that delivers electrical energy to the device's electronic controller and resetting motors.

Those motors, once the inflated energy bladder reaches its optimum rise in the water, power some embodiments in this order: the opening of the pump's air valve, the powering of the pump to deflate the energy bladder, the powering of the air hose drum spool to wind the air hose back onto the drum spool and return of the energy bladder to its start position, the turning off of the drum spool motor and the locking of the drum spool with the energy bladder in its start position, the powering of the pump to inflate the energy bladder and the turning off of the air pump, closing of the pump's air valve and the unlocking of the air hose drum spool once the energy bladder is optimally inflated, as determined by the controller's air pressure sensor or an electric timer, to rise in the water and repeat the cycle.

The device, when using a simple mechanical energy storage system in lieu of its electrical storage battery and a more powerful electrical generator, includes the alternate energy storage system's necessary gearing, configured to achieve the intended purposes at the intended times. The gearing from the device's mechanical energy storage device to the energy bladder's air hose drum spool uses freewheels to allow the energy storage device to release mechanical energy, once triggered by the system's weight container hitting a pawl disengage and lock lever as the weight, lifted by the force of the rising bladder when the weight reaches its optimal rise to its pulley. The lever disengages the cable drum spool's, spring operated, pawl from its drum spool ratchet wheel and locks the pawl in its disengaged position, allowing the cable drum to freely turn independent of the rotation, or lack thereof, of the air hose drum spool because of its freewheel. That freewheel only engages to raise the weight when the air hose drum spool is unwinding as a result of the rising of the air hose drum spool's inflated energy bladder in the water. Another lever at the opposite side of the bladder triggers gearing that opens the pumps air intake valve, allowing the force from the water displaced by the inflated energy bladder to act upon the bladder and force air through the pumps open intake valve and out of the bladder causing the bladder to begin to deflate. When the weight of the water displaced by the deflating energy bladder is sufficiently less than the weight of the mechanical energy storage system's weight the weight, in accordance with Archimedes Principle, begins to descend.

As the weight begins to be pulled back down by the force of gravity it hits the pawl disengage and lock lever again and moves the lever in the opposite direction, causing the pawl's lock to be unlocked and allowing the spring powered pawl to once again, make contact with the gear teeth of the ratchet wheel, but only the back of the ratchet's gear teeth so as to not to engage the pawl with the ratchet wheel's gear teeth. With the weight descending the gearing of the mechanical energy storage system is powered to power the system's electric generator to be powered which in turn provides power to the system's electric controller which turns on the appropriate motors, that are powered by the electric generator powered by the force of the descending weight, at the correct time to power their respective functions in a timely manner to, for some embodiments in this order: power the pump to deflate the energy bladder; power the drum spool rotation motor to wind the air hose back onto the drum spool and return the energy bladder to its start position; power to turn off the drum spool rotation motor, the gearing of which freewheels when the drum spool is unwinding; powering the locking of the air hose drum spool when the energy bladder in its start position; power the pump to inflate the energy bladder; power to turn off the air pump and close the pump's air valve and power the unlocking of the air hose drum spool once the energy bladder is properly inflated, as determined by the controller's air pressure sensor or a timer, to repeat the cycle.

DRAWINGS—REFERENCE NUMERALS

Figure 1:
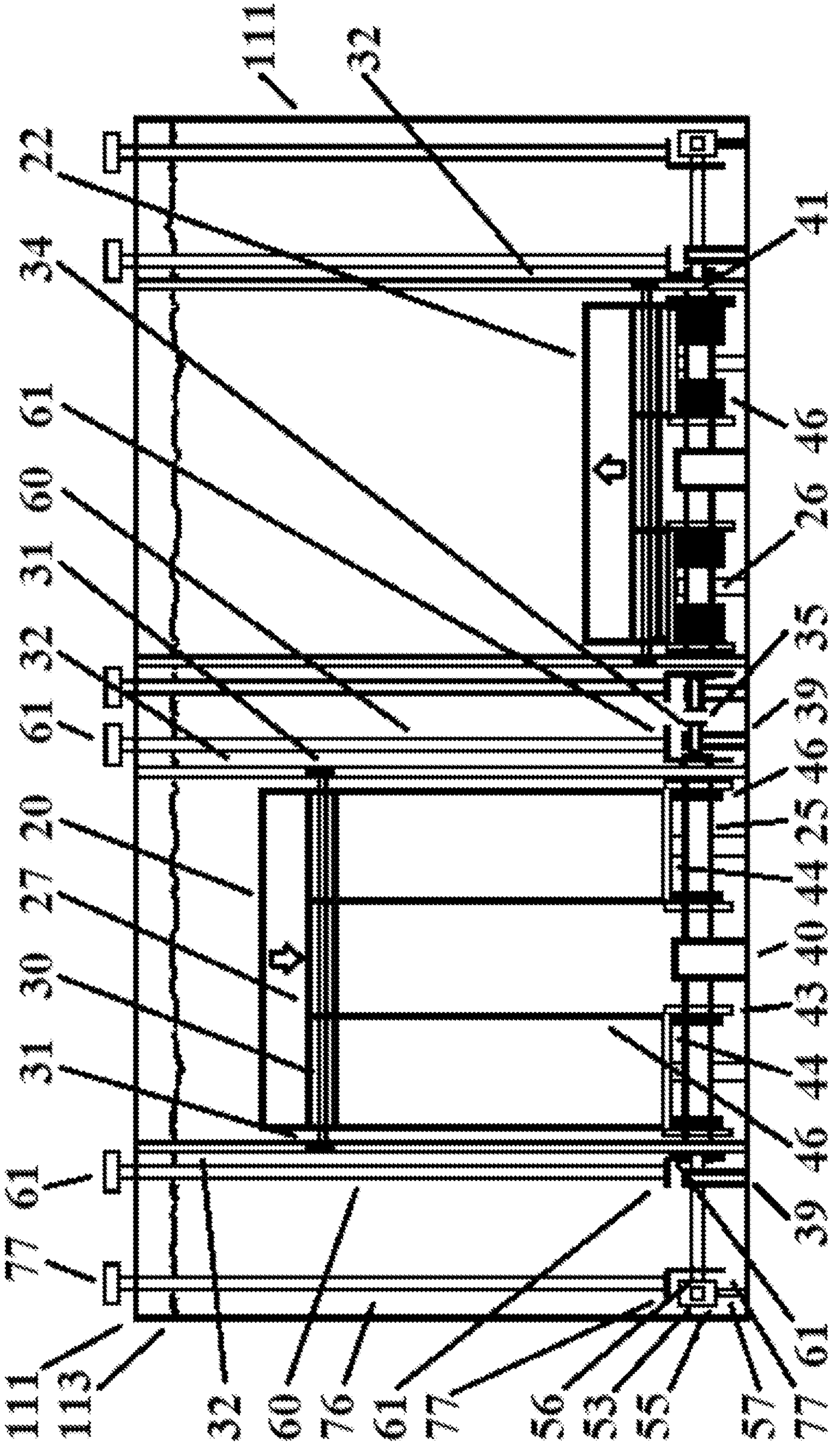
FIG. 1 is a side view of a two energy bladder BFES embodiment showing its first energy bladder at the top of its rise and its second energy bladder at its starting point with both bladders inflated.

20 energy bladder A
21 energy bladder A row
22 energy bladder B
23 energy bladder B row
24 energy bladder
25 energy bladder A drum spool
26 energy bladder B drum spool
27 energy bladder lower part
28 air hose connector fitting
29 air hose connector fitting socket
30 guide rod wheel axle
31 guide rod axle wheel
32 guide rod wheel track
33 drum spool
34 drum spool hollow axle
35 drum spool axle threaded cap
36 drum spool axle internal support with axle hole
37 hollow axle internal support inside threaded part
38 hollow axle internal support perpendicular part
39 drum spool axle external end support with hub
40 drum spool middle support with hub
41 drum spool threaded cap with axle hole
42 drum spool regular polygonal interior
43 drum spool flange
44 drum spool hose guide
45 air pump
46 energy bladder/drum air hose
47 pump valve
48 pump valve motor
49 valve gear wheel
50 valve rack gear
51 valve gate
52 main air pump motor
53 pump air hose/pipe
54 pump air hose wall fitting (& with energy drum valve motor power cable exit)
55 pump air hose/drum spool axle hub
56 air hose support hub/axle rotation fitting
57 pump air hose/drum spool axle hub support
58 air reservoir/compressed air tank
59 electric generator
60 electric generator powering shaft A
61 electric generator powering gear wheel A
62 electric generator powering gear wheel A row
63 electric generator powering shaft B
64 electric generator powering gear wheel B
65 electric generator powering gear wheel B row
66 gear wheel
67 electric generator powering freewheel gear with regular gear teeth
68 electric generator rotor
69 electric generator rotor gear
70 electric generator rotor gear shaft
71 electric generator stator
72 electric power cable
73 electric storage battery
74 electronic controller
75 drum spool rotation motor
76 drum spool rotation powering shaft A
77 drum spool rotation powering gear wheel A
78 drum spool rotation powering gear wheel A row
79 drum spool rotation shaft B
80 drum spool rotation powering gear wheel B
81 drum spool rotation powering gear wheel B row
82 drum spool lock
83 drum spool lock motor
84 lock motor gear wheel
85 lock motor rack gear
86 rack gear tapered peg
87 gear wheel with flat side ring of tapered peg holes
88 energy drum main part
89 energy drum upper part
90 energy drum lower part
91 energy drum air release valve motor
92 energy drum valve motor gear shaft
93 energy drum air release valve
94 energy drum flood port
95 energy drum spool
96 energy drum air hose connector fitting socket, air pipe
97 energy drum power cable hose
98 energy drum A
99 energy drum B
100 drum spool power cable hose guide and drum spool support
101 energy drum power cable hose connector
102 energy drum/bladder BFES
103 energy drum/bladder BFES support
104 buoyancy drum/bladder
105 anchoring cable
106 anchoring cable winch
107 anchoring cable fastener
108 buoyancy drum/bladder sea floor anchor
109 self-propelled, air pump and communication buoy
110 BFES structure
111 BFES structure water compartment
112 BFES structure service corridor
113 water surface
114 air/atmosphere/air bubbles
115 fish
116 processor
117 memory 118 human-machine-interface
119 sensor suite
120 container position data
121 manual adjustment input
122 opening air valve operation
123 engaging air pump operation
124 inflation check operation
125 wind cable hose operation
126 halting drum spool operation
127 first locking drum spool operation
128 engaging air pump operation
129 closing air valve operation
130 unlocking drum spool operation
131 second locking drums pool operation

DETAILED DESCRIPTION

Figure 6:
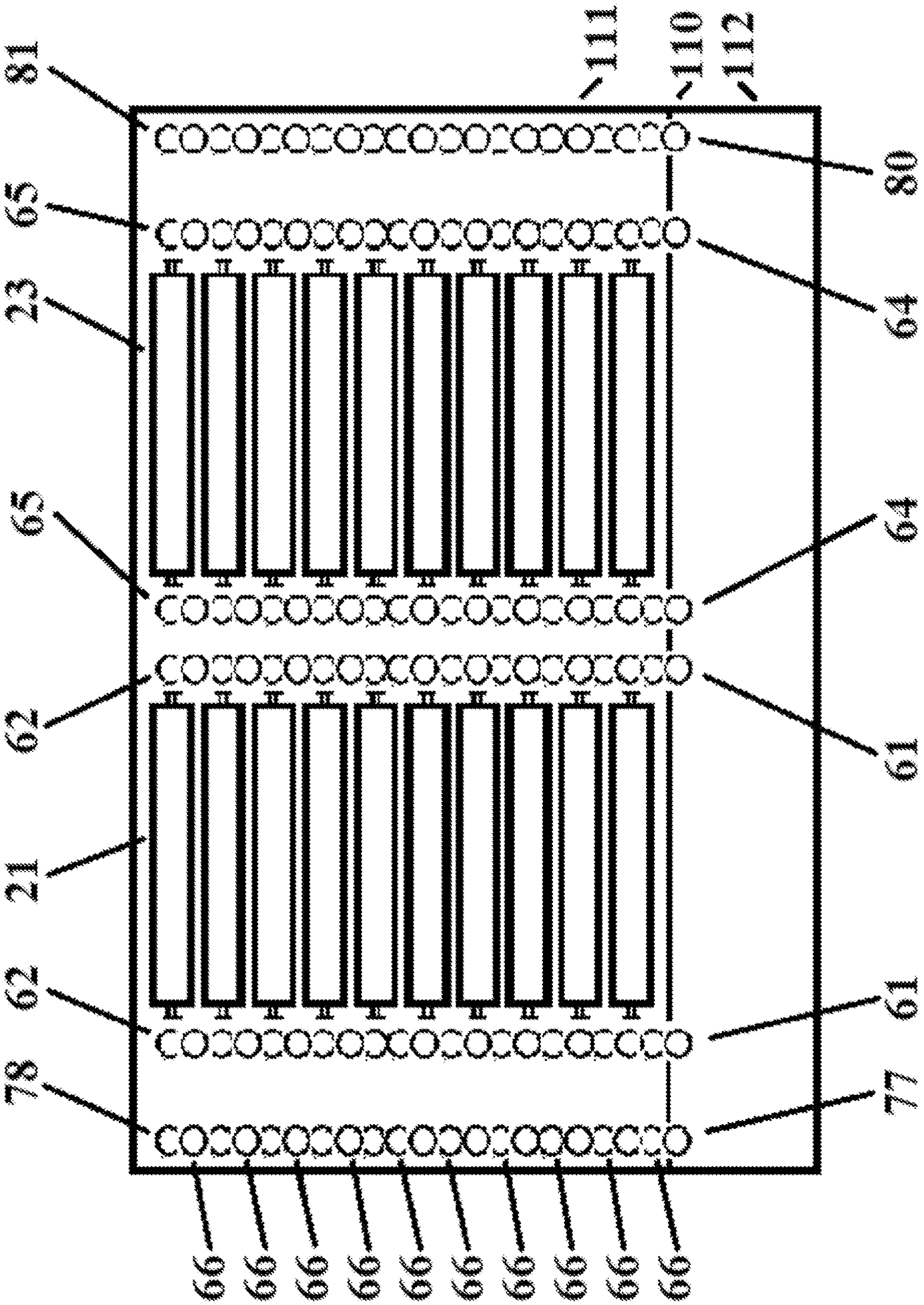
FIG. 6 is a top view of a two row, BFES showing its row A of inflated energy bladders at the top of its rise and its row B of inflated energy bladders at its starting point.

FIG. 1 is a side view of a two energy bladder BFES showing energy bladder A at the top of its rise and near the limit of its air hoses' length and energy bladder B at its starting point and having its air hoses wound around the drum spool showing both energy bladders inflated. The gear wheels engaging the drum rotation gearing and the electric generator powering gearing from inside the water compartment with the drum rotation gearing and electric generator powering gearing of the service corridor are not shown in this view but are shown in FIG. 6.

Moving clockwise from the bottom middle are indicated an energy bladder drum spool axle cap 35, an external energy bladder drum spool axle end support with hub 39, excess air hose 46 still wound on the drum spool A 25, a drum spool hose guide 44 for winding the air hose evenly on the drum spool 25, an energy bladder drum spool middle support with hub 40, a drum spool flange 43, another drum spool hose guide 44 and one of the, non stretching but flexible, unwound air hoses 46 going from the drum spool 25 to the energy bladder. There is sufficient energy bladder air hose air hose remaining on the spool drum after the bladder has reached the intended limit of its rise to allow for the inflated bladder to reach the water's surface so that the energy bladder may be serviced from above through a service hatch in the structure's roof, etc. if necessary. The angle of the air hose from the drum spool to the bladder is to be implied but is not shown.

Continuing clockwise and up the left side of the view are indicated the left side of energy bladder A's, drum spool axle external support with hub 39, an electric generator powering gear wheel A 61 (powered by the rise of energy bladder A), a drum spool rotation powering gear wheel A 77 (powers the rewinding of the air hose 46 on drum spool A), energy bladder A's pump air hose/drum spool axle hub support 57, energy bladder A's pump air hose/drum spool axle, airtight hub 55, a cutaway end view of the pump air hose 53 leading from the hub 55 to the, not shown, air pump and an airtight, air hose support/drum spool axle rotation fitting 56. The drum spool axle is hollow and open on the pump end to allow for the passage of air from the air pump into the energy bladder when inflating and from the energy bladder to the air pump when deflating. The drum spool hollow axle is closed on the opposite end and held within its support by the axle cap 35.

Further clockwise up the left side of the view are indicated the corresponding, drum spool rotation powering gear wheel A 77, the corresponding, electric generator powering gear wheel A 61, a drum spool rotation powering shaft A 76, an electric generator powering shaft A 60 and the left side of the energy bladder's guide rod wheel track 32. Moving further clockwise and across the top of the view are indicated the water's surface 113 of the BFES structure's water compartment 111, another drum spool rotation powering gear wheel A 77 and another electric generator powering gear wheel A 61 that power, respectively, (via a, not shown in this view, reversing gear wheel above the water compartment that powers the corresponding gear wheel at the top of the service corridor), the corresponding drum spool rotation powering and electric generator powering gear wheels above the BFES structure's water compartment of the FIG. 3 BFES structure's service corridor 112. FIG. 1 Continuing clockwise are indicated the energy bladder's left side, guide rod axle wheel 31, the guide rod wheel axle 30, the energy bladder's lower part 27, into which the air hoses and the guide rod wheel axle are secured, and energy bladder A 20.

Continuing further clockwise across the top of the view are indicated the opposite side of energy bladder A's, electric generator powering gear wheel A 61 above the water compartment and the opposite side of energy bladder A's guide wheel track 32 and guide rod axle wheel 31. Further clockwise across the top of the view are indicated the opposite side of the energy bladder A's, electric generator powering shaft A 60, that shaft's 60 lower, electric generator powering gear wheel A 61 and a corresponding electric generator powering gear wheel A 61 secured on the drum spool axle 34 and the BFES's energy bladder B 22. Continuing clockwise are also indicated the water compartment 111, the right side of energy bladder B's 22 guide rod wheel track 32, energy bladder B's drum spool's threaded cap with axle hole 41 and wound air hose 46 on the energy bladder B drum spool 26.

Figure 2A:
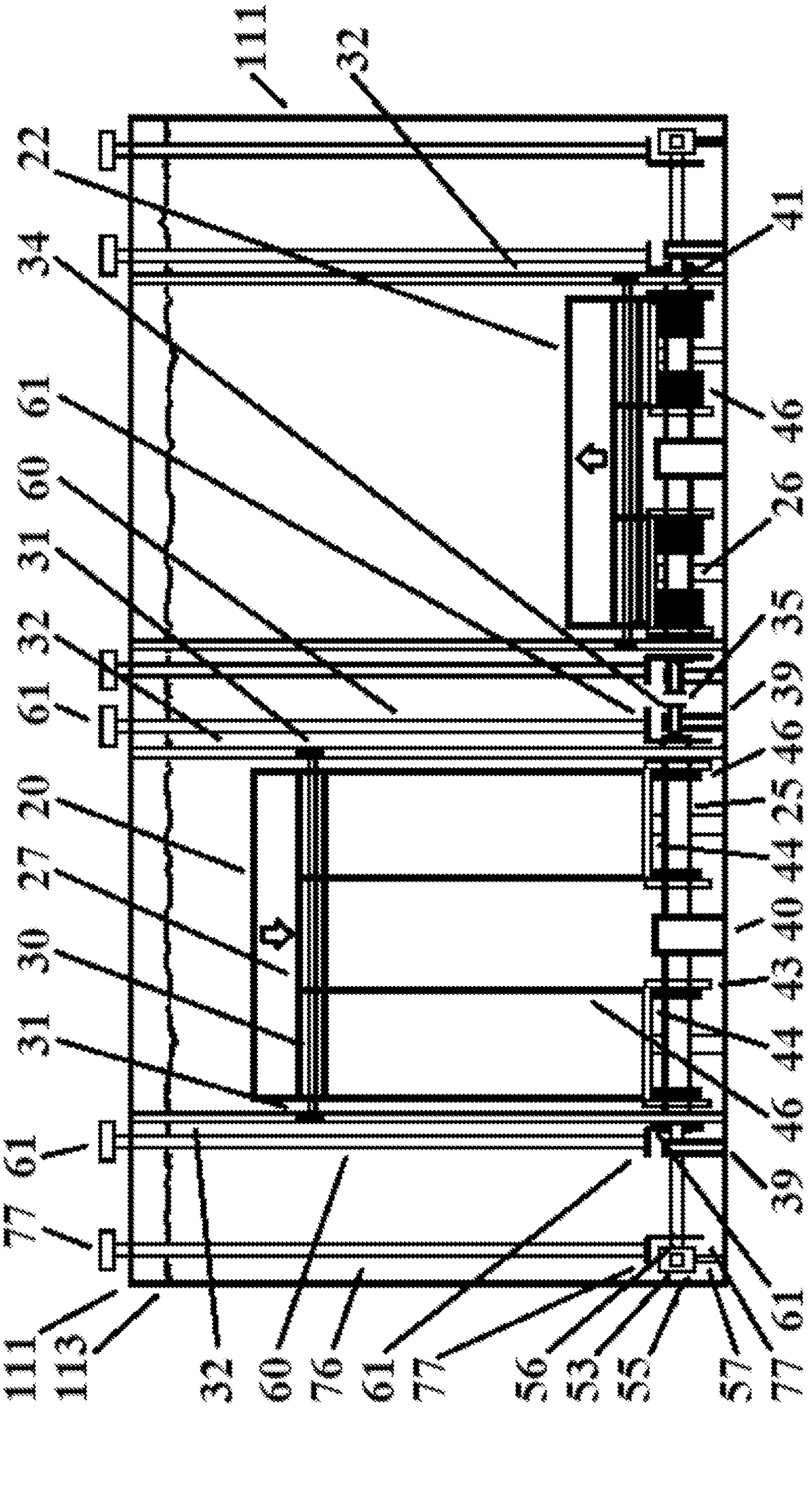
FIGS. 2*a-b* is another side view of the two energy bladder BFES embodiment showing its first energy bladder at its starting point and its second energy bladder at the top of its rise.

FIG. 2*a* is another side view of the two energy bladder BFES showing energy bladder A at its starting point and having its air hoses wound around the spool drum and energy bladder B at the top of its rise near the limit of its air hoses length with both bladders being inflated. The gear wheels engaging the drum rotation gearing and the electric generator powering gearing from inside the water compartment with the drum rotation gearing and electric generator powering gearing of the service corridor are not shown in this view but are shown in FIG. 6. Moving counter clockwise from the bottom middle are indicated an energy bladder drum spool axle cap 35 of drum spool A, an external, drum spool axle end support with hub 39 of drum spool B, a drum spool flange 43 of the energy bladder B drum spool, air hose 46 from the drum spool B to energy bladder B, the drum spool 26 of energy bladder B, a drum spool hose guide 44 for winding the air hose evenly on the drum spool 26, another drum spool flange 43, still wound air hose 46 remaining on the drum spool 26. There is sufficient energy bladder air hose air hose remaining on the spool drum after the bladder has reached the intended limit of its rise to allow for the inflated bladder to reach the water's surface so that the energy bladder may be serviced from above through a service hatch in the structure's roof, etc. if necessary. The angle of the air hose from the drum spool to the bladder is be implied but is not shown.

Continuing counter clockwise and up the right side of the view are indicated the right side energy bladder drum spool axle external support with hub 39, an electric generator powering gear wheel B 64 (powered by the rise of energy bladder B), a drum spool rotation powering gear wheel B 80 (powers the rewinding of the air hose 46 on drum spool B), energy bladder B's pump air hose/drum spool axle support 57, energy bladder B's pump air hose/drum spool axle hub 55, a cutoff end view of the pump air hose 53 and an airtight, air hose support/drum spool axle rotation fitting 56. The drum spool axle is hollow and open on the pump end to allow for the passage of air from the air pump into the energy bladder when inflating and from the energy bladder into the air pump when deflating. The drum spool hollow axle is closed on the opposite end.

Further clockwise up the right side of the view are indicated the corresponding, drum spool rotation powering gear wheel B 80, the corresponding, electric generator powering gear wheel B 64, a drum spool rotation powering shaft B 79, an electric generator powering shaft B 63 and the right side of energy bladder B's guide rod wheel track 32. Moving further clockwise and across the top of the view are indicated the water's surface 113 of the BFES structure's water compartment 111, another drum spool rotation powering gear wheel B 80, another electric generator powering gear wheel B 64, the energy bladder's right side, guide rod axle wheel 31, the guide rod wheel axle 30, the energy bladder's lower part 27 into which the air hoses and the guide rod are secured and energy bladder B 22.

Figure 2B:
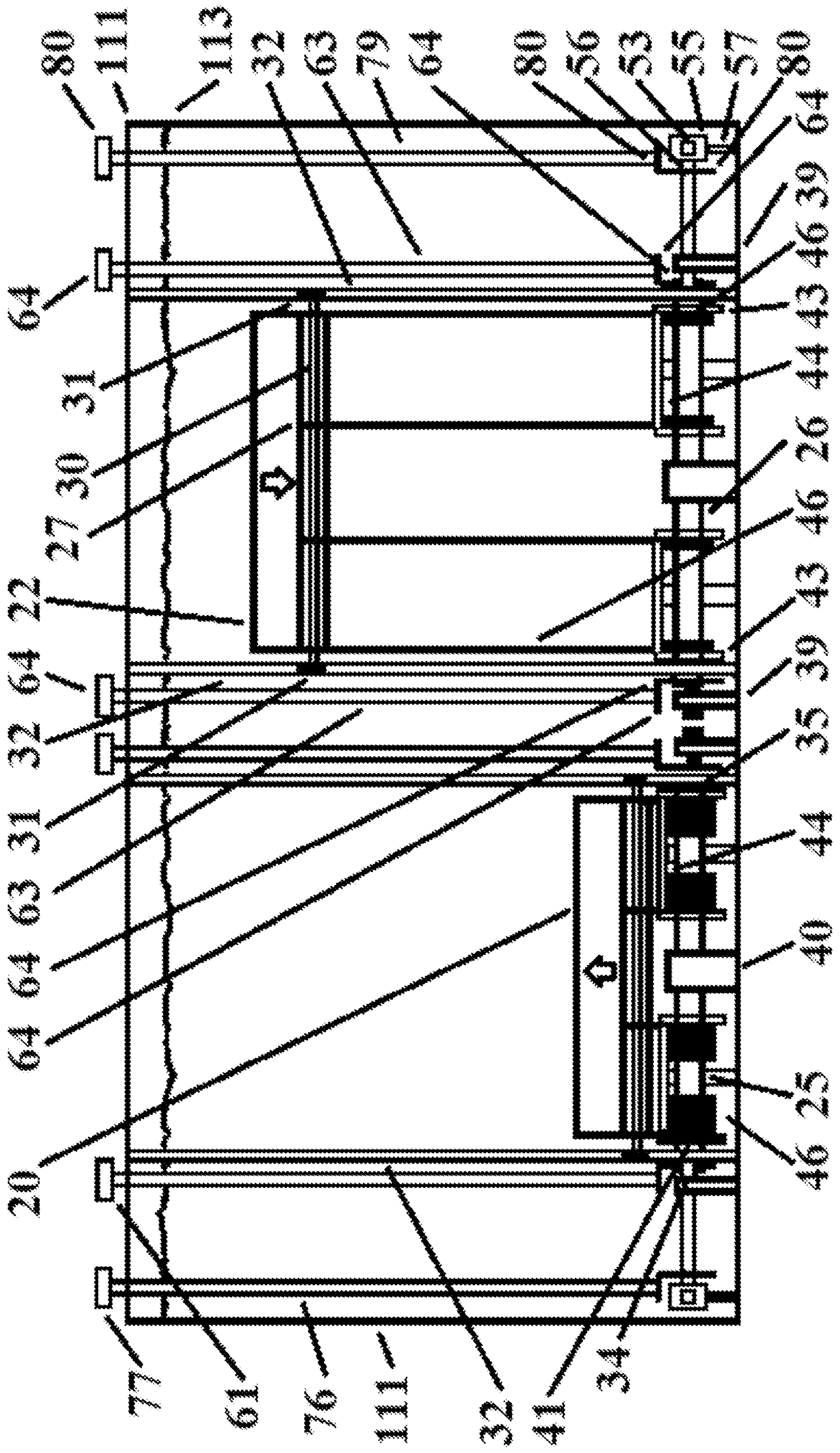

Continuing counter clockwise across the top of the view are indicated the opposite side of energy bladder B's, electric generator powering gear wheel B 64 above the water compartment and the opposite side of energy bladder B's guide wheel track 32 and guide rod axle wheel 31. Further counter clockwise across the top of the view are indicated the opposite side of energy bladder B's, electric generator powering shaft B 63, the corresponding electric generator powering gear wheel B 64 secured on the, not indicated, drum spool axle that corresponds to the shaft's 63 lower, electric generator powering gear wheel B 64 and energy bladder A 20. Continuing further counter clockwise are indicated energy bladder A's 20 drum rotation powering gear wheel A 77, an electric generator powering gear wheel A 61 of energy bladder A 20, the drum spool rotation powering shaft A 76 and the water compartment 111. Also indicated are the left side of energy bladder A's 20 guide rod wheel track 32, energy bladder A's drum spool's threaded cap with axle hole 41, the hollow axle of drum spool A's, wound air hose 46 on drum spool A 25, a drum spool middle support with hub 40 and a drum spool hose guide 44. FIG. 2*b* repeats the embodiment of FIG. 1.

Figure 3:
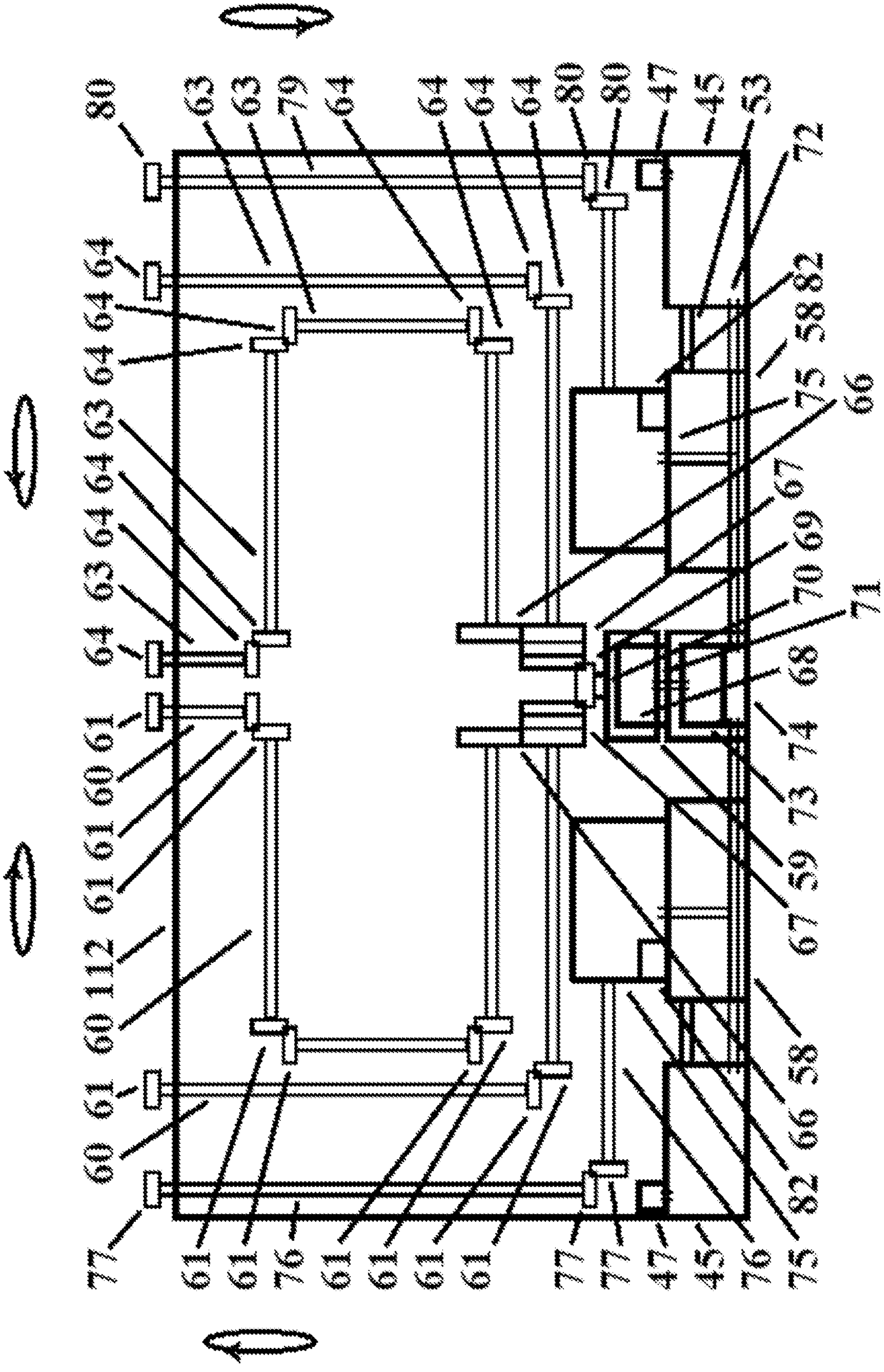
FIG. 3 is a side view of the two energy bladder BFES embodiment showing its shared electric generator's stator and electric storage battery.

FIG. 3 is a side view of the two energy bladder BFES showing its service corridor's shared by both energy bladders, electric generator's stator and electric storage battery. The view is of the inside of the service corridor facing the water compartment of an BFES structure. The gear wheels engaging the drum rotation gearing and the electric generator powering gearing from inside the water compartment with the drum rotation gearing and electric generator powering gearing of the corridor are not shown in this view but are shown in FIG. 6. Moving clockwise from the bottom middle side of the view are indicated the electric generator rotor gear 69, the rotor gear shaft 70, the electric generator's stator 71 and rotor 68, the electronic controller 74 and electric storage battery 73 and the electric generator 59.

Continuing clockwise across the bottom of the view are indicated the, not shown, energy bladder A's electric power generating gearing's freewheel gear 67 also having regular gearwheel teeth. The freewheel gear's right side, regular gear teeth power the electric generator rotor gear when the energy bladder is rising and freewheels with the electric generator rotor gear when the energy bladder's air hose is being rewound on its drum spool. Further clockwise across the bottom of the view are indicated an air reservoir 58, a reversing gear wheel 66 that powers the electric generator powering freewheel gear via the freewheel gear's left side regular gear wheel teeth, the drum spool lock 82, which locks the deflated bladder at its starting point and allows for inflation of a deflated bladder without the energy bladder being inflated rising prematurely before reaching its full energy generating potential, and the drum spool rotation motor 75.

Moving clockwise up the left side of the view are indicated a drum spool rotation powering shaft A 76, the air pump 45 and the air pump valve 47 for, not shown in this view, energy bladder A and two meshing drum spool rotation powering gear wheels 77 & 77. The drum spool rotation motor's, not shown in any views, freewheel gear engages when powering the gearing for winding the hoses and freewheels when the energy bladder is rising and unwinding its hoses from its drum spool so as to not have the added resistance to the inflated energy bladder's (or energy drum's) rise that would otherwise be caused by the drum spool rotation motor 75. Further up the left side of the view are indicated two pairs of meshing electric generator powering gear wheel A's 61 & 61 and 61 & 61, the latter pair of which's shafts are shown but not indicated, another drum spool rotation powering shaft A 76 and another pair of meshing electric generator powering gear wheel A's 61 & 61.

Continuing clockwise and across the top of the view are indicated the drum spool rotation powering gear wheel 77 that meshes with the, not shown in this view, gear wheel that meshes with the corresponding gear wheel of, and above, the water compartment of the BFES structure as shown in FIG. 6. FIG. 3 Further clockwise across the top of the view are indicated an electric generator powering shaft A 60, that shaft's 60 upper gear wheel 61, another electric generator powering shaft A 60, the BFES structure's service corridor 112, another pair of meshing electric generator powering gear wheel A's 61 & 61, another electric generator powering shaft A 60 and that shaft's 60 upper electric generator powering gear wheel A 61.

Moving further clockwise across the top of the view are indicated an electric generator powering gear wheel B 64, that gear wheel's 64 shaft 63, that shaft's 63 lower gear wheel 64, a gear wheel 64 meshing with that electric generator powering gear wheel 64 and that gear wheel's 64 shaft 63. Continuing clockwise across the top of the view are indicated another pair of meshing electric generator powering gear wheel B's 64 & 64 and another electric generator powering gear wheel B 64. Continuing clockwise and down the right side of the view are indicated a drum spool rotation powering gear wheel B 80, two electric generator powering shaft B's 63, a drum spool rotation powering shaft B 79, two pairs of meshing electric generator powering gear wheel B's 64 & 64 and 64 & 64 and two meshing drum spool rotation powering gear wheel B's 80 & 80, the latter of which's shaft is shown but not indicated.

Continuing clockwise and across the bottom of the view are indicated, not shown in this view, energy bladder B's air pump valve 47 and air pump 45, an air pipe or hose 53 between the air pump 45 and the air reservoir and some of the BFES's electric power cabling 72. Further clockwise across the bottom of the view are indicated the drum spool lock 82 for, not shown in this view, energy bladder B air hoses' drum spool B, an air reservoir 58 and a drum spool rotation motor 75 for the, not shown in this view, energy bladder B drum spool. Also indicated are another electric generator powering reversing gear wheel 66 and a freewheel gear 67 powered by the reversing gear wheel 66 via the freewheel gear's right side, regular gear teeth. The left side, regular gear wheel teeth of the freewheel gear are meshing with the rotor gear. The shafts upon which the reversing gear wheel 66 is mounted and the shaft of the freewheel gear 67 relative to the, not shown in this view, energy bladder B are shown but not indicated.

Figure 4:
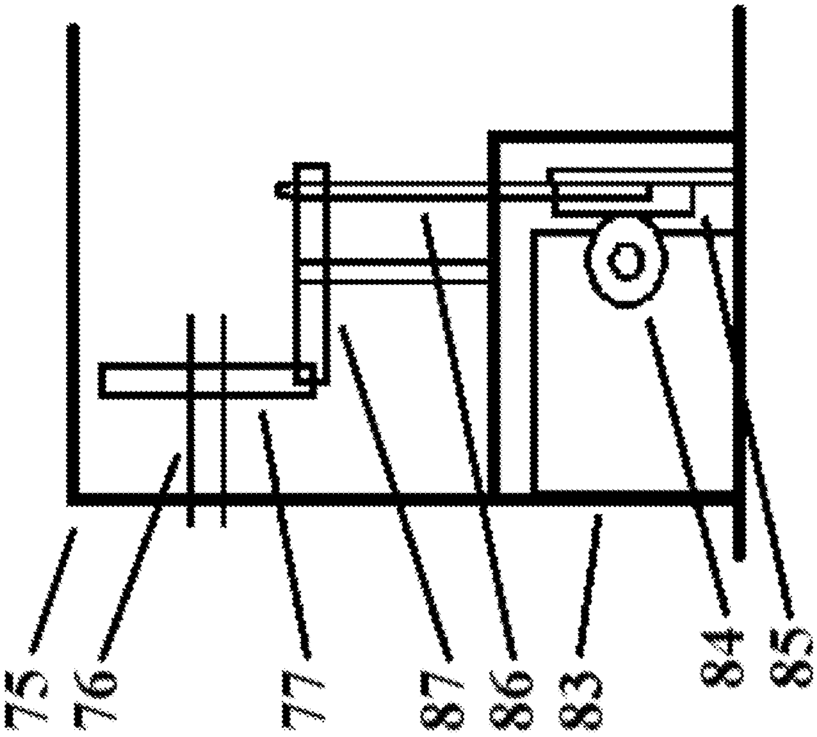
FIG. 4 is a cutaway view of the drum spool lock showing the lock's tapered peg.

FIG. 4 is a cutaway view of the energy bladder drum spool A drum spool lock showing the lock's tapered peg. Moving clockwise up the left side of the view are indicated the drum spool lock's lock motor rack gear 85, lock motor gear wheel 84, the lock motor 83, the rack gear tapered peg 86 attached to the rack gear 85, the lock's gear wheel with a flat side ring of tapered peg holes 87 attached to its, not indicated, vertical shaft inside the drum spool rotation motor, a drum spool rotation powering gear wheel 77 inside of the drum spool rotation motor's housing, a drum spool rotation powering shaft 76 partially inside the drum spool rotation motor's housing and the drum spool rotation motor 75.

Figure 5:
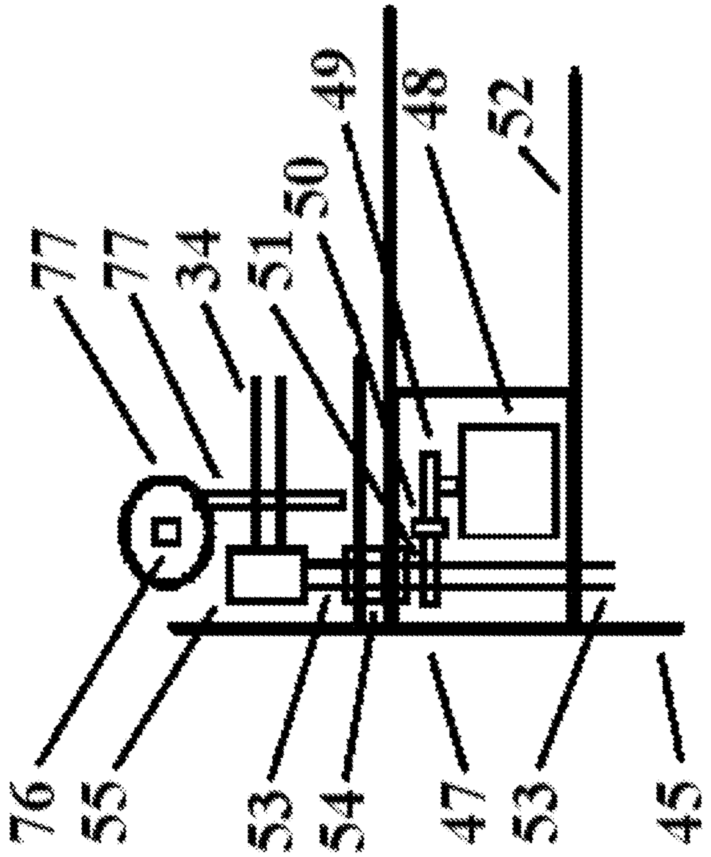
FIG. 5 is a partial cutaway top view of an BFES air pump system showing its air valve.

FIG. 5 is a cutaway top view of an BFES air pump system for an energy bladder A showing its air valve. Moving clockwise from the lower left are indicated the air pump 45, an air pipe 53 from the air pump 45 to the pump valve 47, a pump air hose wall fitting 54 (the wall is actually much thicker than what is shown), a pump air hose 53, a pump air hose/drum spool axle hub 55 and a drum spool rotation powering shaft 76 A. Continuing clockwise down the right side of the view are indicated two meshing drum spool rotation powering gear wheels 77 & 77, the drum spool hollow axle 34, the pump valve gate 51 attached to the pump valve rack gear 50 which is powered by the pump valve gear wheel 49 attached to the, not indicated, drive shaft of the pump valve motor 48. Also indicated is the main air pump motor 52.

FIG. 6 is a top view of a two row, BFES showing its row of energy bladder A's inflated energy bladders at the top of its rise and its row B of inflated energy bladders at its starting point. The gear wheels engaging the drum rotation gearing and the electric generator powering gearing from inside and above the water compartment with the drum rotation gearing and electric generator powering gearing of the corridor are shown in this view. Moving from the bottom left, up the left side and across the top of the view are indicated the top drum spool rotation powering gear wheel 77 inside the service corridor, a reversing gear wheel 66, the first, top drum spool rotation gear 77 above the water compartment and several reversing gear wheels 66 of the drum spool rotation powering gear wheel A row 78 of drum spool rotation powering gear wheels. The balance of the corresponding drum spool rotation gear wheels 77 to the reversing gear wheels 66 are shown but not indicated. The reversing gear wheels allow for all of the gear wheels of a row to power in the same direction.

Continuing clockwise across the top of the view are indicated an electric power generator powering gear wheel A row 62, the energy bladder A row 21 and another electric power generator powering gear wheel A row 62. Further clockwise across the top of the view are indicated an electric power generator powering gear wheel B row 65, the energy bladder B row 23, another electric power generator powering gear wheel B row 65 and the drum spool rotation powering gear wheel B row 81 of drum spool rotation powering gear wheels. The individual drum spool rotation powering gear wheels and reversing gear wheels are shown but not indicated.

Moving clockwise down the right side and across the bottom of the view are indicated the BFES structure's water compartment 111, the BFES structure 110 itself, the BFES structure's service corridor 112 and the corridor's top drum spool rotation powering gear wheel B 80, top electric generator powering gear wheel 64, another top electric generator powering gear wheel 64, a top electric generator powering gear wheel A 61 and another top electric generator powering gear wheel A 61.

Figure 7:
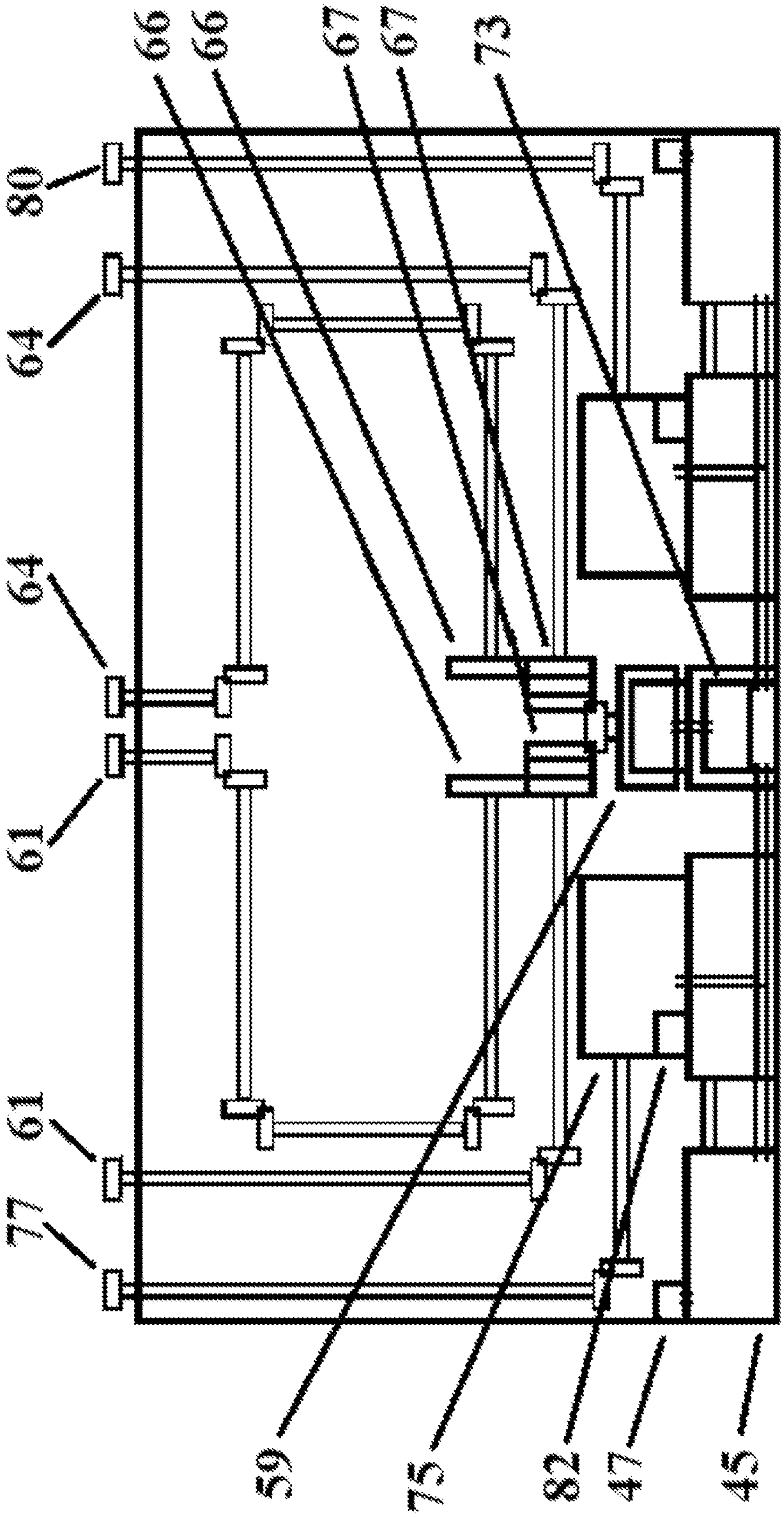
FIG. 7 is a side view of the two row, energy bladder BFES embodiment showing its shared by both rows, gearings more powerful electric generator, electric storage battery, air pump, and etc.

FIG. 7 is a side view of the two row, energy bladder BFES showing its, shared by both rows, gearings' more powerful electric generator, electric storage battery and electronic controller, stronger gearing, larger air reservoir and a row's more powerful air pump and drum spool rotation motor. Moving clockwise from the lower left side of the view are indicated energy bladder A row's air pump 45, pump valve 47, drum spool lock 82 and drum spool rotation motor 75. The drum spool rotation motor's, not shown in any views, freewheel gear engages when powering the gearing for winding the hoses and freewheels when the energy bladder is rising and unwinding its hoses from its drum spool so as to not have the added resistance to the inflated energy bladder's (or energy drum's) rise that would otherwise be caused by the drum spool rotation motor 75.

Continuing up the left side and across the top of the view are indicated the electric generator 59, a drum spool rotation powering gear wheel A 77, an electric generator powering gear wheel A 61, another electric generator powering gear wheel A 61, an electric generator powering gear wheel B 64, another electric generator powering gear wheel B 64 and a drum spool rotation powering gear wheel B 80. Moving clockwise down the right side of the view are indicated an electric generator powering reversing gear wheel 66 of the electric generator powering gearing of the, not shown in this view, energy bladder A row, an electric generator powering reversing gear wheel 66 of the electric generator powering gearing of the, not shown in this view, energy bladder B row, a freewheel gear 67, having both freewheel gear teeth and regular gear teeth, of the electric generator powering gearing of the, not shown in this view, energy bladder A row and a freewheel gear 67, having both freewheel gear teeth and regular gear teeth, of the electric generator powering gearing of the, not shown in this view, energy bladder B row. The more powerful electric storage battery 73 is also indicated.

Figure 8:
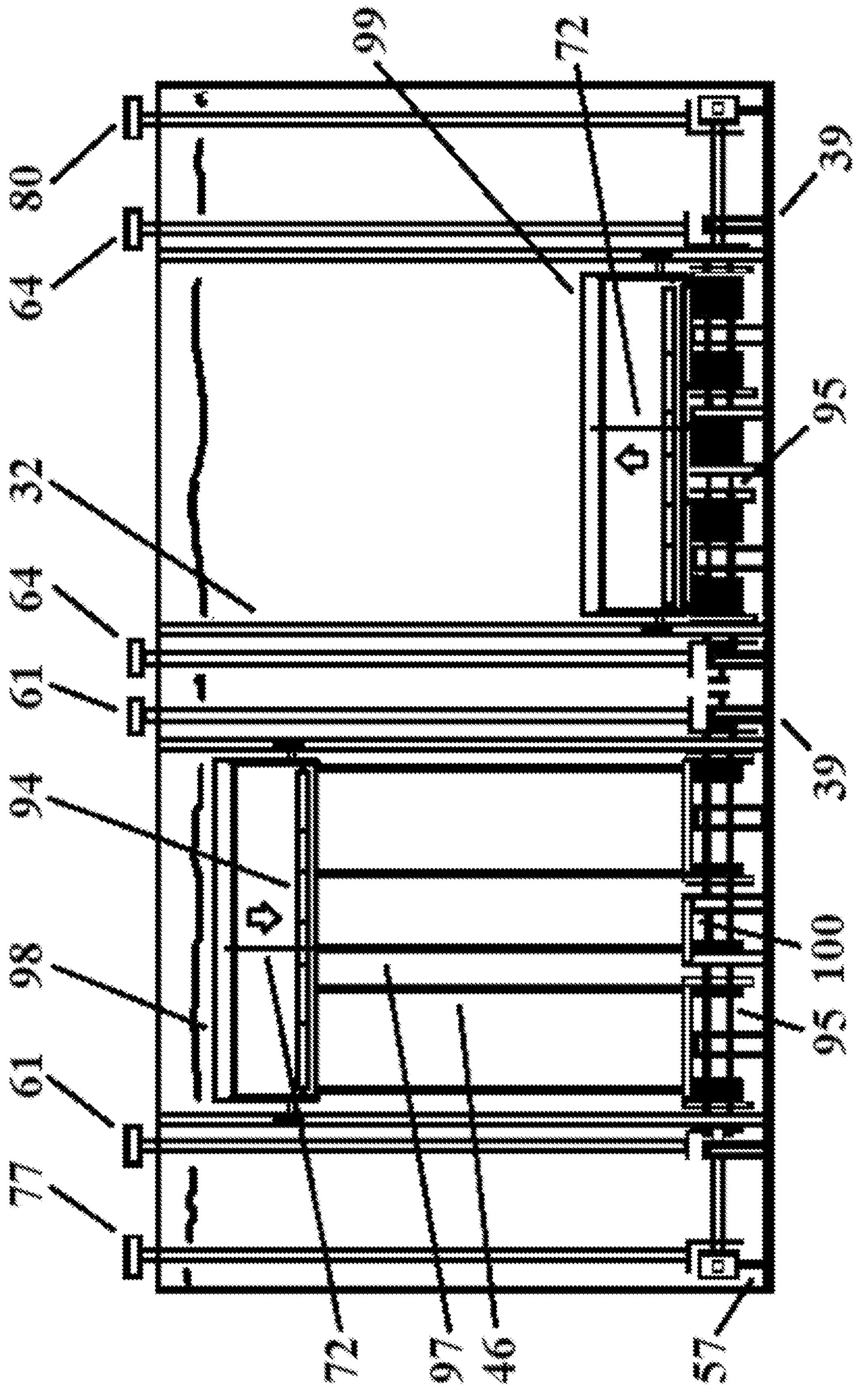
FIG. 8 is a side view of a two energy drum BFES embodiment showing its energy drum A at the top of its rise and its energy drum B at its starting point.

FIG. 8 is a side view of a two energy drum BFES showing energy drum A at the top of its rise and energy drum B at its starting point. Moving clockwise from the bottom middle and up the left side of the view are indicated a drum spool A axle external end support with hub 39, a drum spool power cable hose guide and drum spool support 100, the drum spool 95 for energy drum A, a pump air hose/drum spool axle hub support 57, an energy drum compressed air hose 46, an energy drum electric power cable hose 97 and an electric power cable 72. The energy drum power cable hose attaches securely to the bottom of energy drum A and, like the air hoses, bears the pull of the drum spool being turned to unwind or wind the air hose as the energy drum is ascending or descending. The electric power cable to the energy drum valve motor attaches via the its hose connection at the bottom of the drum but the power cable does bear any of the pull of the drum spool being turned to unwind or wind the air hose as the energy drum is ascending or descending.

Continuing clockwise across the top of the view are indicated a drum spool rotation powering gear wheel A 77, an electric generator powering gear wheel A 61, energy drum A 98, energy drum A's 98 flood port 94 and another electric generator powering gear wheel A 61. Continuing further clockwise across the top of the view are indicated an electric generator powering gear wheel B 64, a guide rod wheel track 32 for energy drum B, another electric generator powering gear wheel B 64 and a drum spool rotation powering gear wheel B 80. Moving clockwise down the right side and across the bottom of the view are indicated energy drum B 99, the power cable 72 from the bottom of the energy drum B's 99, not shown in the view, power cable hose connector to the energy drum valve motor, a drum spool axle external end support with hub 39 for the drum spool of energy drum B 99 and energy drum B's air and power cable hose drum spool 95.

Figure 9:
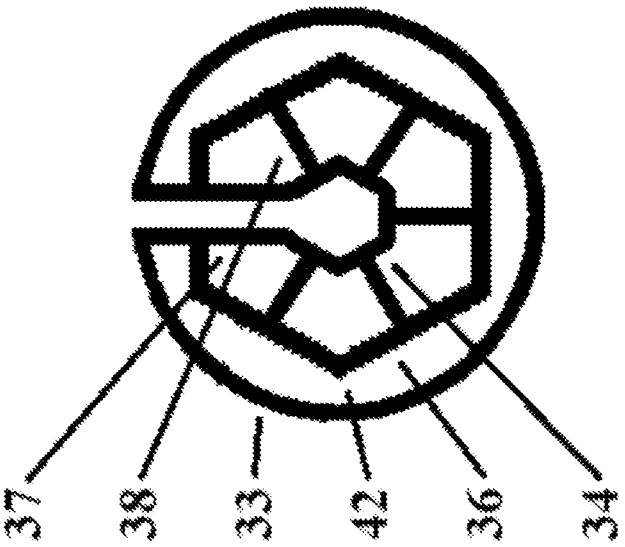
FIG. 9 is an inside end view of spool drum showing the drum's, polygonal, inside shape.

FIG. 9 is an inside end view of spool drum showing the drum's, regular polygonal, inside shape. Moving clockwise from the bottom left and up the left side of the view are indicated correspondingly regular polygonal shaped and sized drum spool axle 34 within the internal support's 36, not indicated, correspondingly sized and shaped drum spool axle hole, the regular polygonal interior 42 of the drum spool 33, one of the internal support's 36 solid perpendicular parts 38, and one of an internal support's inside threaded parts 37 for a, not shown in this view, correspondingly shaped and sized, air hose's or electric power cable hose's connector fitting.

The correspondingly sized and shaped regular polygonal interior of the drum spool corresponds to the internal support's, not indicated, outer polygonal shape and the drum spool axle (the axle is rounded and threaded at the ends but regular polygonal shaped where it fits within the internal supports drum spool axle hole) corresponds to the internal support's regular polygonal axle hole. The correspondingly regular polygonal shapes of the spool drum's interior, the internal support's exterior, the internal support's axle hole and the part of the drum spool hollow axle to be inserted into and permanently secured within the internal support's drum spool axle hole allow for the drum spool axle to turn the drum spool when powered to wind hose and the drum spool axle to turn the drum spool when the hose is being unwound from the drum spool as a result of the rise of an energy bladder or energy drum.

The internal support is slightly beveled at the ends for insertion of the internal support within the externally round, tubular drum spool's regular polygonal shaped interior wall hole but this is not shown in the view. The interior support slide's into the drum spool's internal support hole with a lubricant adhesive that eases insertion of the interior support and, after curing, forms an airtight, waterproof seal and holds the interior support permanently within the drum spool. The drum spool axle fits and secures within the interior support's drum spool axle in the same manner.

The internal support may also be simply a part of the drum spool axle or, as illustrated, the internal support and the drum spool axle may be a separate parts of the BFES altogether with the correspondingly shaped axle fitting within the internal support's correspondingly shaped and sized axle hole.

Figure 10:
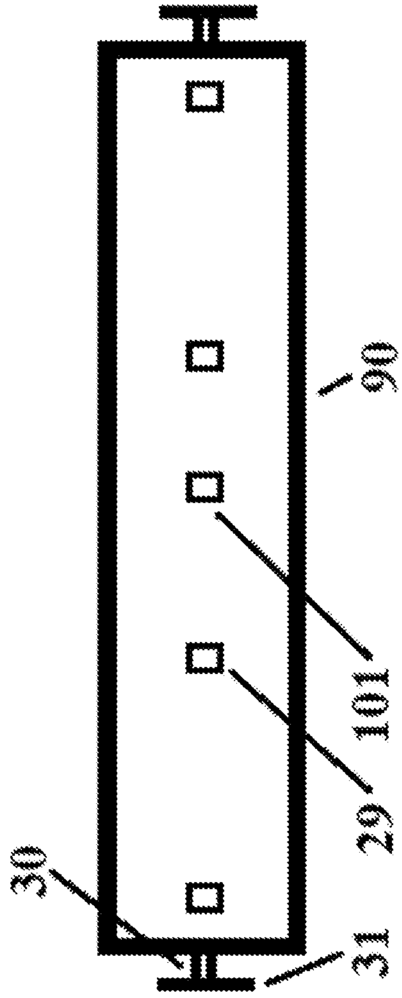
FIG. 10 is a bottom view of an energy drum showing the energy drum's hoses' connections.

FIG. 10 is a bottom view of an energy drum showing the drum spool's air hoses' empty connection sockets and power cable hose's connector socket. Moving clockwise from the bottom middle of the view are indicated a bottom view of an energy drum's lower part 90, the energy drum electric power cable hose connector 101, one of the drum's air hose connector fitting sockets 29, an energy drum guide rod wheel 31 and its guide rod wheel axle 30. The guide rod wheel is shown proportionately much larger than its actual size.

Figure 11:
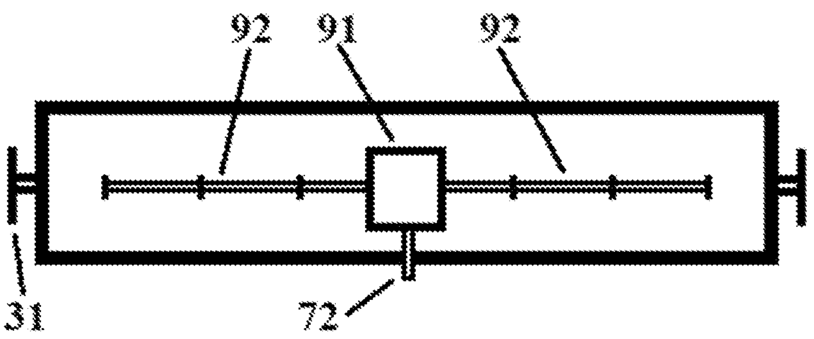
FIG. 11 is a partially cutaway top view of an energy drum showing its valve motor.

FIG. 11 is a partially cutaway top view of an BFES energy drum showing the air valve motor and gear shaft. The valve is not shown in this view. Moving clockwise from the bottom middle of the view are indicated an electric power cable 72 connected to the air release valve motor, a guide rod axle wheel 31 (shown proportionately much larger than its actual size) the energy drum valve motor gear shaft 92, the energy drum air release valve motor 91, and the other side of the energy drum valve motor's 91 gear shaft 92. The gear shaft supports are shown but not indicated.

Figure 12:
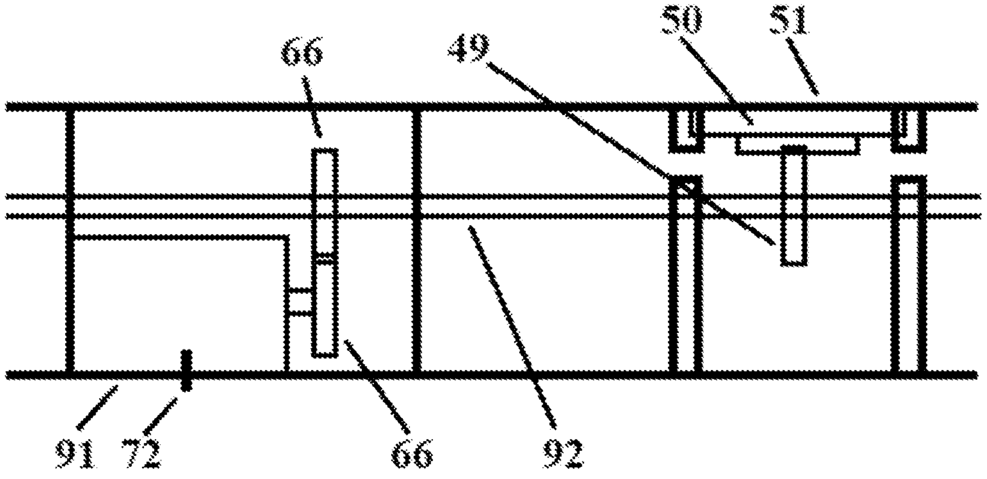
FIG. 12 is a cutaway side view of an BFES energy drum embodiment showing its valve gate.

FIG. 12 is a cutaway side view of an BFES energy drum showing its valve motor, gear shaft and valve gate. Moving counter clockwise from the bottom left side of the view are indicated the air release valve motor 92, the motor's 92 electric power cable 72, a gear wheel 66 attached to the, not indicated, valve motor drive shaft that powers a gear wheel on the valve motor gear shaft so as to turn the shaft to open or close the air release valve's gate 51 when the gate's 51 attached valve gear rack 50 is so powered by the gear shaft's 92 valve gear wheel 49. Also indicated is the valve gear shaft's 92 gear wheel 66 powered by the gear wheel attached to the air release valve motor's 91 drive shaft.

Figure 13:
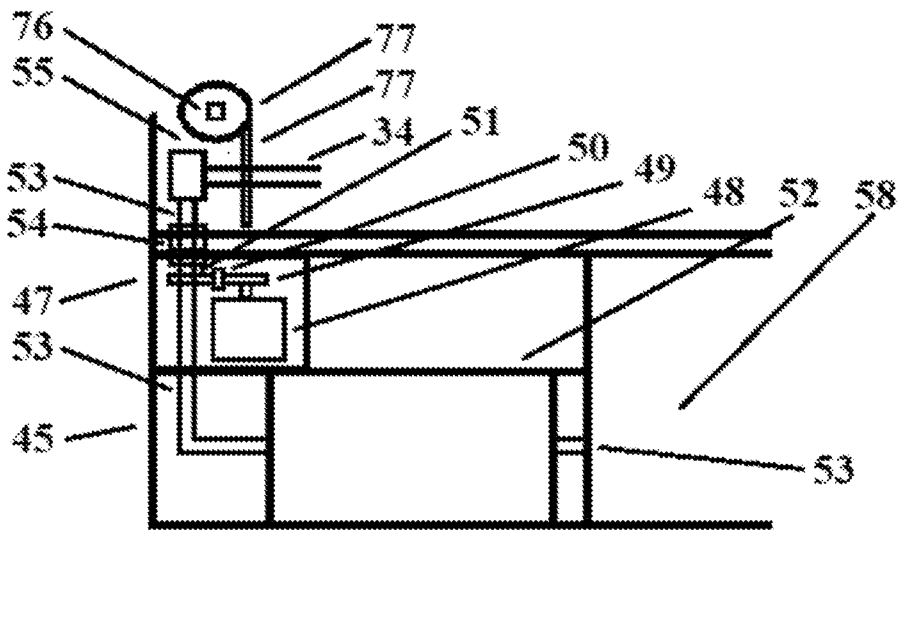
FIG. 13 is an expanded cutaway top view of an energy drum BFES air pump system.

FIG. 13 is an expanded top view of an energy drum BFES air pump system for energy drum A showing its air valve. Moving clockwise from the lower left side of the view are indicated the air pump 45, an air pipe 53 from the air pump 45 to the pump valve 47, a pump air hose wall fitting 54, a pump air hose 53, a pump air hose/drum spool axle hub 55 and a drum spool rotation powering shaft A 76. The wall fitting has an airtight electrical outlet through which the drum's air release valve motor's power cord is connected which connects that motor to the BFES's electric battery power source but this is not shown in the view. Continuing clockwise down the right side of the view are indicated two meshing drum spool rotation powering gear wheel A's 77 & 77, the drum spool hollow axle 34, the pump valve gate 51 attached to the pump valve rack gear which is powered by the pump valve gear wheel 49 attached to the, not indicated, drive shaft of the pump valve motor 48 to open or close the valve. Also indicated is the air pump main motor 52, the air pump system's air reservoir/compressed air tank 58 and a pump air pipe 53 leading from the air reservoir/compressed air tank 58 to the main air pump motor 52.

Figure 14:
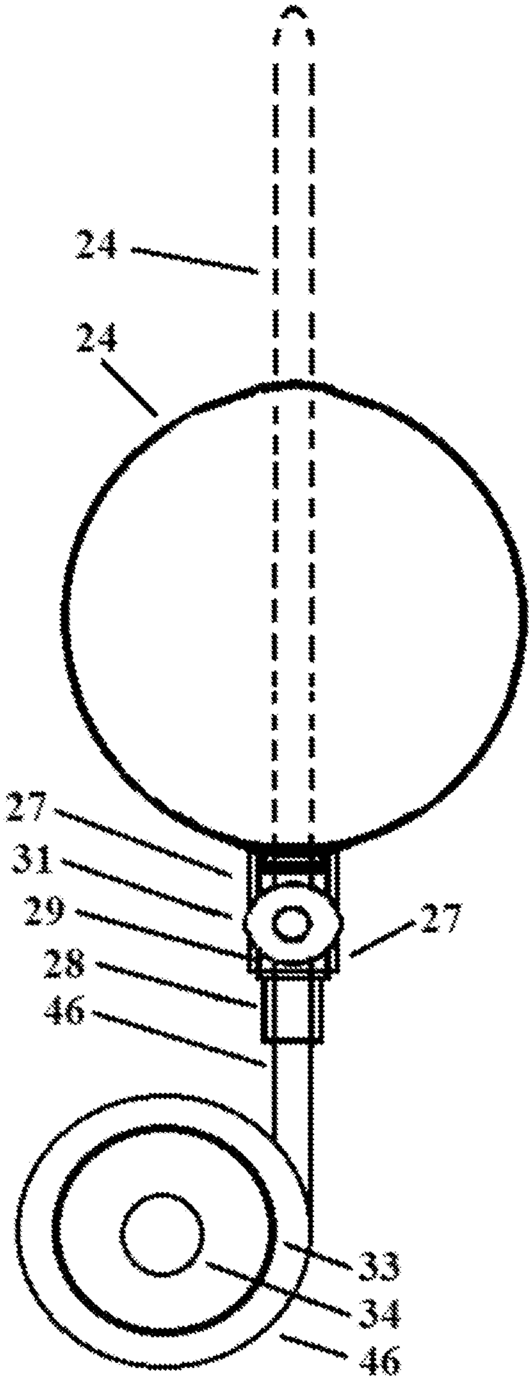
FIG. 14 is an end view of an energy bladder showing its approximate shapes.

FIG. 14 is an end view of an energy bladder showing its approximate shape. Moving clockwise from the lower middle right side and up the left side of the view are indicated the energy bladder's lower part 27, drum spool 33, drum spool hollow axle 34, air hose 46 still wound on the drum spool 33, air hose 46 from the drum spool 33 to the energy bladder, the air hose connector fitting 28, the air hose connector fitting socket 29, that side of the energy bladder lower part's guide rod axle wheel 31 and, again, the energy bladder lower part 27 into which the air hose connections and the, not indicated in this view, guide rod wheel axle are secured. Continuing further up the left side of the view are indicated the optimally inflated for energy production when rising, energy bladder 24 and, shown by the broken vertical lines, that energy bladder 24 optimally deflated for resetting to its starting point.

Figure 15:
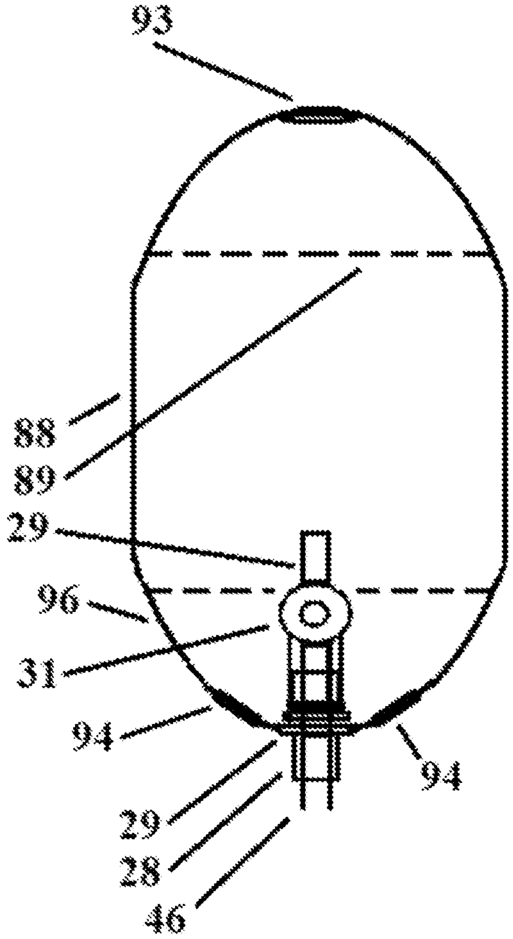
FIG. 15 is a partially cutaway end view of an BFES energy drum embodiment showing its approximate shape.

FIG. 15 is a, partially cutaway around the energy drum's lower part, end view of an energy drum showing its approximate shape. Moving clockwise from the bottom right and up the left side of the view are indicated an energy drum flood port 94, an energy drum compressed air hose 46 from the drum spool to the energy drum, the air hose connector fitting 28, the air hose connector fitting socket 29, another flood port 94, that side of the energy drum's guide rod axle wheel 31 outside of the energy drum, the energy drum's lower part 90 and the, inside of the energy drum, energy drum air hose connector fitting socket, air pipe 96 leading from the socket 29 into the energy drum. Note that the pipe's 96 open end is well above the drum's flood ports 94. Pressure in the air pipe against its, not shown, purge valve, is adequate to keep water out of the air pipe when the drum is flooded for retraction to its starting point.

Continuing further up the left side of the view are indicated the energy drum's upper part 89, the energy drum's main part 88 and the air release valve's opening 93 closed or opened by the, not shown in this view, air release valve's flood gate. The broken horizontal lines show the approximate boundaries of the energy drum's upper, main and lower parts. Both water and air flow freely from one part of the energy drum to another part of the energy drum depending upon whether the drum is flooded, filled with compressed air or in the process of filling with water or compressed air.

Figure 16:
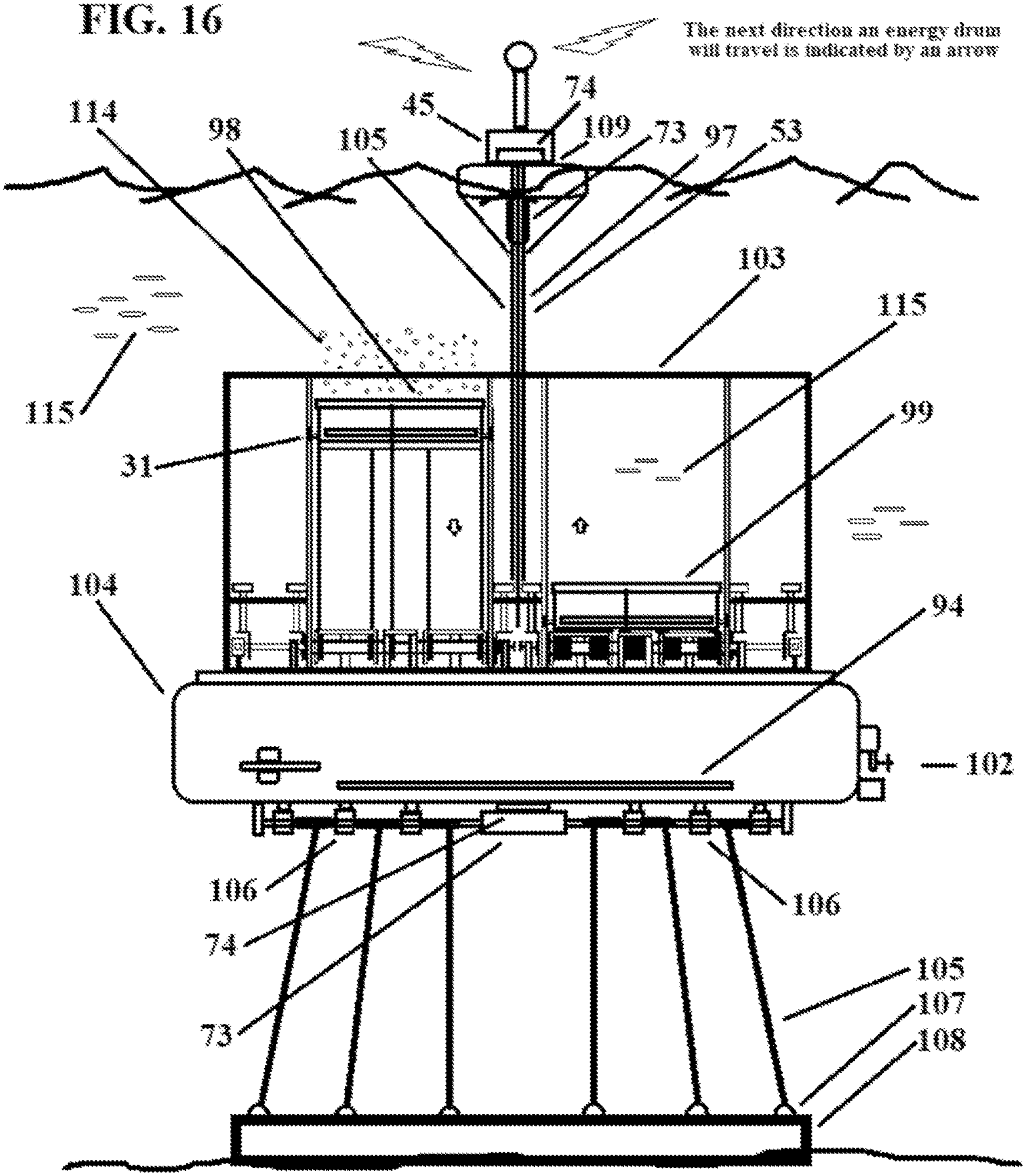
FIG. 16 is a side view of a two energy drum row BFES embodiment in open ocean water showing its buoyancy drum's anchoring to the sea floor and its air pump and communication buoy.

FIG. 16 is a side view of a double, two row energy drum BFES submersible in open ocean water showing its optimally sized buoyancy drum spool, anchoring to the sea floor and self propelled, air pump and communication buoy. The depth of the open ocean water can be much greater than what is shown but the buoyancy drums and energy drums must be made of much stronger material, like thicker graphene, to withstand the greater pressures at greater depths. Made of the proper materials, one BFES may operate on top of another BFES with neither inhibiting the operation of the other at great depths.

The communication and electronic power cable hoses, buoy pump air hose and the anchoring cable hose of the BFES buoy, reach all the way down to the, not shown in the view, respectively, the submerged BFES's service compartment's electronic controller, electric storage battery, compressed air reservoirs, etc. of both the energy drums and the buoyancy drum and the BFES's underwater winch for retrieving the buoy and winding its anchoring, air pump, communication and electric power hoses on the BFES's winch drum spool. The two energy drum rows of energy drums, their supports and gearing, etc. are divided in half by having a, much lower to the bottom of the BFES, service corridor being that the BFES is in open water.

Pumps, motors, gearing, drum spool locks, electric generators, electric storage batteries, electronic controllers and air reservoirs for each half are on each side of the corridor. Because the BFES is in open water and not on land and having a water compartment for the drum or energy bladder to rise in, the service compartment is much lower in height as are the vertical gear shafts powering drum spool rotation for rewinding unwound air and power cable hose and for powering the electric generator.

The buoyancy drum and/or service compartment may be equipped with a bridge and crew quarters for both on the surface and below the surface operation but this is not shown in the view. The entire BFES is coated with an environmentally friendly coating that prevents barnacle and other marine growth on the BFES. This can be reapplied as needed both on the surface or below the surface by surrounding the submerged BFES or parts of, with a ballast bladder, blowing out the water and sending in the coating devices through the bladder's air locks. Fleets of BFESs can travel the seven seas and the environment where the BFESs pass through, or remain, flourishes as a result of the increased aeration of the water. The BFES may be equipped with both underwater and above water drone, etc. charging station berths but this is not shown in the view as well.

The self propelled buoy keeps its desired position on the water's surface above the submerged BFES because of its navigation system and the navigation system of the submerged BFES. The submersible BFES has below water communication lights for transmitting light signals, like a video morse code that can be much more sophisticated for internet communication, etc. and light beacons for homing purposes with other submersibles as well as underwater telescopes for reading those signals from another submersible BFES or other submersibles at a distance, which allow for underwater communication and guidance, via the BFES's computer system, between BFESs and other submersibles but this is not shown in the view. This is referred to by the inventor as underwater telition. The same system can work in outer space across vast distances for communication in space in almost real time. In space the communication system is referred to by the inventor as simply telition.

Moving clockwise from the bottom left side of the view are indicated the buoyancy drum's electric storage battery 73, electronic controller 74, one of the winches 106 used to wind and unwind the buoyancy drum's (or bladder's) anchoring cable, which can be automatically unhooked from its anchor, which could simply be another buoyancy drum that has been totally flooded, and be wound up individually for leveling purposes or all at once using all of the buoyancy drums electronic winches 106 controlled by the buoyancy drum's electronic controller and powered directly or indirectly by the rise of the BFES's energy drums.

Continuing further up the left side and across the top of the view are indicated the buoyancy drum 104, an energy drum's guide rod wheel 31, some fish 115 attracted to the air bubbles 114 being exhausted from the energy drum A row as its energy drum begins filling with water prior to having its air and power cable hoses wound on their drums (it's a row of energy drum As and a row of energy drum Bs) and the first energy drum 98 of the, not shown, energy drum A row. Continuing clockwise across the top of the view are indicated a self-propelled, air pump and communication buoy's retractable anchoring cable hose 105, the buoy's air pump compressor 45 and the buoy's electronic controller. The buoyancy drum can be driven onboard or remotely, on the surface or underwater to its destination as suggested by the buoyancy drum's, shown but not indicated, left side bow planes, its electric motor and rudder and its indicated, left side flood ports.

Further clockwise across the top and down the view's right side of the view are indicated the self-propelled air pump and communication buoy 109, the electric power cable hose 97, the buoy air compressor pump air hose 53 leading to the not shown, winch's, anchoring cable hose, air hose, and electronic power and communication cable hose, drum spool and from the drum spool into the compressed air reservoir and the service corridor and etc. The winch is secured to the, not shown in the view, service corridor's recessed winch berth which allows the retracted buoy to set flush upon the top of the corridor when traveling underwater or on the surface. Continuing down the right side of the view are indicated some more fish 115, illustrating that all of the energy drums of that row are working at the same time and are at their starting point, that the BFES is an open water BFES and that the BFES is beneficial to the ecology. The energy drums of each half of energy drum A row may, however, be timed to start its energy drums' rise in the open water at the same time as the opposite half of energy drum B's half row for facilitating leveling of the BFES in open water purposes during energy production operation. the first energy drum 99 of the energy drum B row. Further down the right side of the view are indicated the buoyancy drum's left side flood port 94, the entire, open water BFES 102 from, and including, its anchor to, and including, its buoy 109 and another anchoring cable winch 106. Moving further clockwise down the right side of the view are also indicated an anchoring cable 105, an anchoring cable fastener 107 and the buoyancy drum sea floor anchor 108.

The anchoring cables of the buoyancy drum may also be anchoring and power cables that have a self-propelled, remote controlled, anchor hook control, underwater drone at the end of the anchoring power cable that unlocks or locks the hook that holds the buoyancy drum to the anchor weight but this in not shown in the view.

Figure 17:
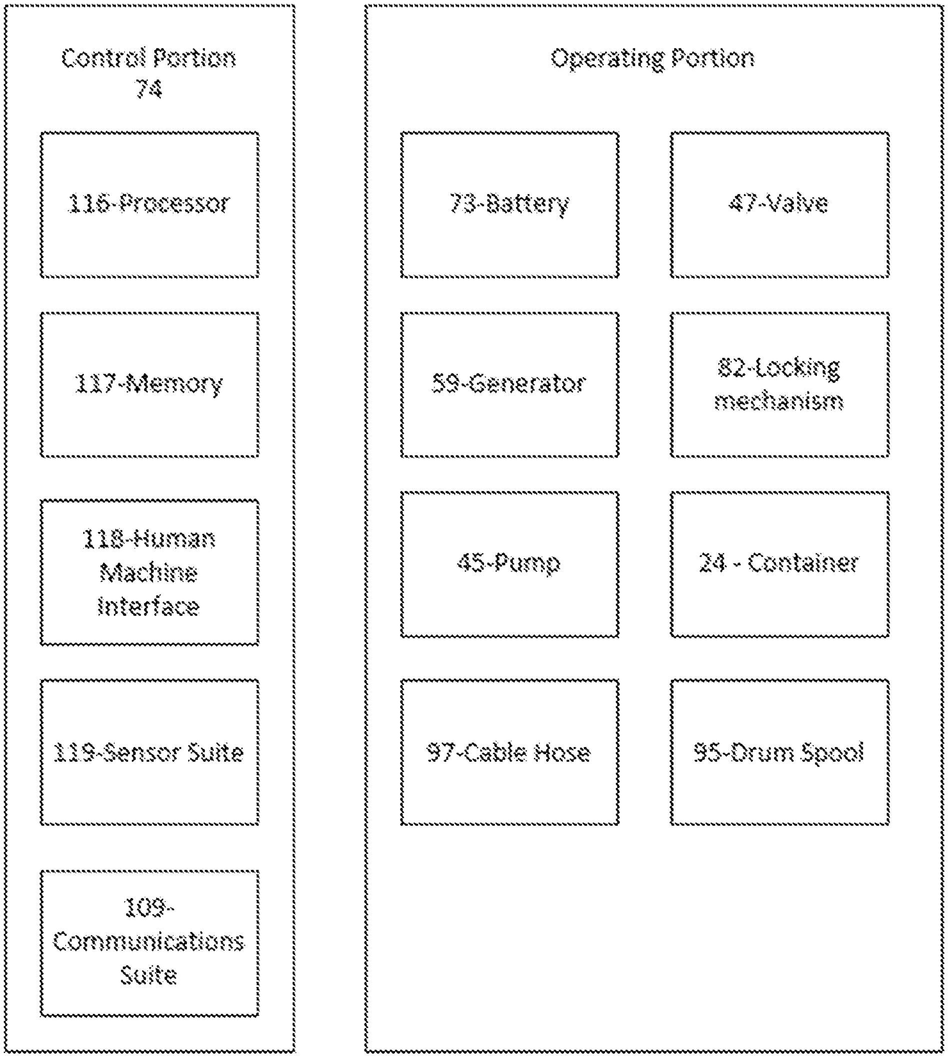
FIG. 17 discloses an illustrative energy generating apparatus, according to the energy bladder and energy drum embodiments of the BFES.

FIG. 17 illustrates an embodiment of the present disclosure. The energy generating system comprises a control portion 74, which provides the energy generating system with control and timing signals, as well as an interface with the operating portion. The control portion 74 may comprise a processor 116 which may execute instructions which cause the processor 116 to control the operation of the operating portion, receive data, send data, etc. The operating instructions may be stored on a non-transitive memory 117, such as NVRAM, NAND FLASH, NOR FLASH, etc. The control portion may also comprise one or more human-machine interfaces 118 (e.g. input devices such as a touchscreen, keyboard or keypad, stylus, computer mouse, a camera, and/or microphone, and output devices such as a display screen, a speaker, light emitting diodes (LEDs) or other light sources, and/or haptic feedback devices), which may allow an operator to update the instructions of the processor 116 or otherwise modify the timing, control states, and position or various components of the operating portion. A sensor suite 119 may be communicatively coupled to the processor, and may enable the input or output of information, including status or positions of the components of the operating portion (e.g., gear tooth sensors, cycle counters, force sensors, battery state, pressure sensors, gyroscopes, accelerometers, etc.), environmental conditions (e.g., water or air current sensors, temperature sensors, pressure sensors, etc.), etc. Additional information may be inferred by the processor 116 in conjunction with the sensors (e.g., a container height may be computed from a gear wheel sensor of a drum spool and a current flow sensor). The control portion may also include a communications suite 109 which may be configured to send or receive wired or wireless transmissions (e.g., underwater or via a buoy disposed along the surface of the water). These transmissions may include environmental data, control signals, status information, navigational data, etc.

The operating portion, which may benefit from the control and supervision of the control portion 74, generates the energy of the system, which, in the illustrated embodiment, includes electrical energy as well other forms of energy, such as thermal or chemical energy which may be stored by a battery 73, which may enable the system to operate during inclement weather, maintenance, or normal operation while not instantaneously generating power. In addition to or instead of a battery, some embodiments may utilize another form of energy storage such as a flywheel, pressure vessel, etc. The operating portion may also include a valve 47, which may be electronically controlled, pneumatically controlled, etc. In some embodiments, the valve 47 may be controlled by the control portion which may, beneficially, allow the operation of the valve to be optimized based on improved design, the status of other components, etc. The valve 47 may selectively couple a fluid barrier, such as between air and water, or between high pressure air and low pressure air, and the operation of the system may depend on such operation, for example, a valve to flood or purge a container 24, or to control the flow of gas into or out of a pressure vessel or reservoir.

The operating portion may also comprise a generator 59 to convert one form of energy to another (e.g., an electromechanical generator may convert mechanical energy to electrical energy). The control portion may control the system (e.g., the gearing of the drum spool 95) in order to optimize the operation (e.g., power, efficiency, timing, stresses, etc.) of the generator, as well as other components. For example, the control portion 74 may engage a locking mechanism 82 which may impede the rotation of the drum spool 95, associated gears, etc., as a part of normal system operation, maintenance, or emergency. In some embodiments, manual controls may also be operable for normal operation, maintenance, or emergency. These additional controls may interface with the control portion entirely or partially (i.e., rely on) for status, or not at all.

The operating portion may also comprise a pump 45 which may operate in place of, in conjunction with, or in addition to the valve 47. The control portion 74 may enable a pump 45 based on a timer, a sensed location of another component, or another sensed or inferred condition such as a threshold temperature or pressure being reached (as detected, e.g., using sensor suite 119). The pump 45 may control the pressure of a reservoir, a body of the system, or a container 24. The container may be of a rigid (e.g., drum) or non-rigid (e.g., bladder) design, and may comprise sensors such as current sensors, temperature sensors, pressure sensors, etc. which may be communicatively coupled to the control portion 74 and be used to monitor or operate the system. For example, system operation may be halted or altered if a sensed current exceeds a specified ability of a cable hose 97 to reliably tether the container and/or maintain in fluid communication with the container.

It is noted that, in various embodiments, the control portion 74 may include additional or fewer components, as may the operating portion. For example, operating portion may also include a sensor suite and and/or a communications suite. Additionally, in various embodiments, the components of control 74 and may be rearranged, individual components may be separated into two or more components, and/or two or more components may be integrated into one component as deemed suitable.

Figure 18:
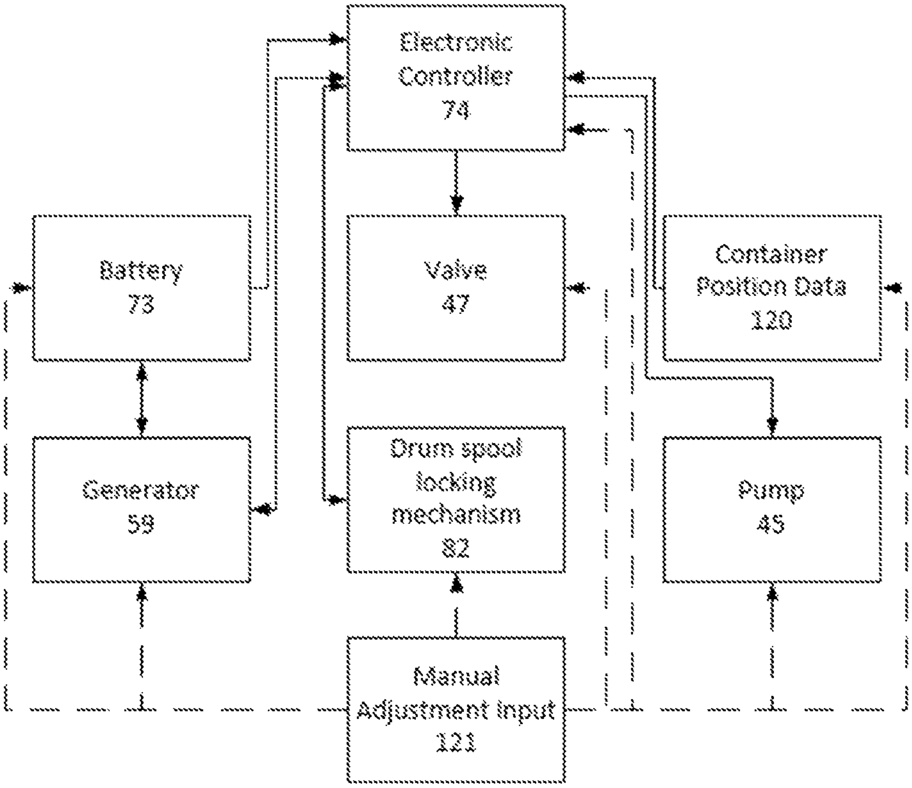
FIG. 18 illustrates potential paths of energy and/or control signals in, for example, the energy generating apparatus of FIG. 17, according to the energy bladder and energy drum embodiments of the BFES.

FIG. 18 also illustrates an embodiment of the present disclosure. The directional arrows indicate the path of energy or control signals (e.g., between or among the control portion 74 (and/or one or more components thereof) and the operating portion (and/or one or more components thereof)). Other embodiments may contain alternative, additional, or fewer paths. An electronic controller, 74, may receive position data 120 relating to the position of a container. The position data may be based on, for example, the number of rotations of a drum spool, the time elapsed since a prior action was taken (e.g., to wind a drum spool to cause the container to descend, or to fill a container with gas to cause the container to ascend), a pressure sensor connected to the container, one or more motion detectors and/or position sensors, etc. The electronic controller 74 may be powered by a generator 59, either directly, or indirectly, such as when the electronic controller 74 is powered by a battery 73, which may be charged by the operation of a generator 59. Alternatively or additionally, the electronic controller may operate based on another source of power. The electronic controller may be configured to interface with one or more valves which may, for example, enable the controller to control the filling of a container with a gas, or the evacuating of the gas from the container. In some embodiments, the valve 47 may be controlled in combination with one or more pumps 45. In FIG. 18, the valves 47 and pumps 45 are disclosed as being controlled by the electronic controller with no return signal. Other embodiments may include return data, such as the state of the devices, or other information. The electronic controller may also be communicatively coupled with a drum spool locking mechanism 82, which may allow the container to arrest the rotation of the drum spool, for example, as a part of normal operation, or in response to an aberrant event or for routine maintenance.

The electronic controller may also be configured to control operations manually, by a manual adjustment input 121. For example, the manual input 121 could comprise an input screen communicatively coupled to the controller, a plurality of manual levers, buttons, etc., which may interface with the electronic controller 74. The manual input 121 may be used to manually adjust a mechanism during one or more operations, such as at initial setup or periodic maintenance, or to adjust system components for repair. Instead of, or in addition to, manual input 121 interfacing with the electronic controller 74, hydraulic mechanical, geared, or other manually operated devices may enable adjustments as required for repair, maintenance, etc. without any interface to the electronic controller 74. The electronic controller 74 may be configured to allow for and/or report such adjustments, or may be disabled during such operations.

In various embodiments, the electronic controller can include a single processor, which can have one or more cores, or multiple processors. In some embodiments, processing unit(s) can include a general-purpose primary processor as well as one or more special-purpose co-processors such as graphics processors, digital signal processors, or the like. In some embodiments, some or all processing units can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) can execute instructions stored in local storage. Any type of processors in any combination can be included in processing unit(s). Signals can be transmitted and received through a transceiver, using any suitable wired or wireless communication protocol(s), such as Wi-Fi, Bluetooth, near-field communication (NFC), etc.

Figure 19:
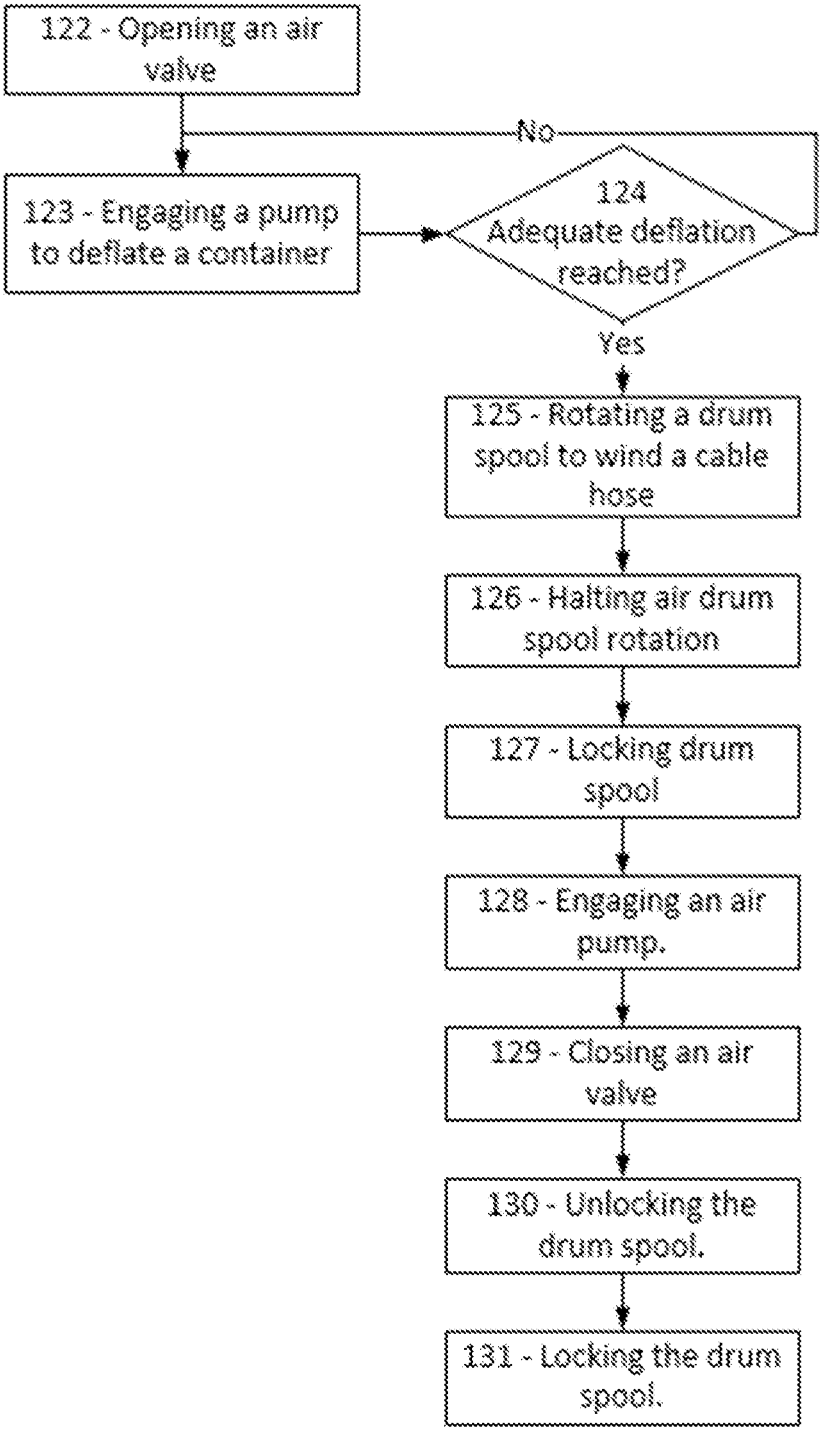
FIG. 19 discloses an illustrative method, according to the energy bladder and energy drum embodiments of the BFES.

FIG. 19 discloses an illustrative method of the present disclosure, which may be achieved by one or more of the systems disclosed herein, as well as by other systems, which one skilled in the art will understand may be formed by combining elements of disclosed systems and variations thereof. At operation 122, an air valve is opened to enable a container to have a gas expelled. The valve may be disposed within or proximate to the container, or it may be connected to the container through a cable hose, or otherwise be in fluid communication with the container in an opened state. As used herein, fluid communication shall mean coupled so as to allow for a transfer of fluid (e.g., a hose which is connected to a container, which may pass air into the container is in fluid communication with the container). At operation 123, a pump is enabled to deflate a container. Like the valve, the pump may be disposed in a variety of locations, and needs only to be in fluid communication with the gas of the container. The pump may be placed in order to, for example, minimize an observed noise, maximize efficiency, ease operation and maintainability, etc. In some embodiments, the pump may compress the gas into a compressed gas reservoir. Some embodiments may rely on the pressure of a fluid surrounding the container to evacuate (i.e., deflate, flood, etc.) the gas into a gas reservoir, in addition to or instead of the pump (e.g. water pressure on a bladder type container, or from flooding a container). Alternatively, the gas may be vented to the atmosphere, which may, advantageously, aerate the surrounding water (e.g., to benefit underwater flora and fauna). The decision to pump the gas into a reservoir, or to the atmosphere, may also be based on an observed noise, efficiency, availability of a sound-deadening housing, etc. At operation 125, a drum spool is rotated to wind a cable hose onto the drum.

In some instances, the controller may perform operation 125 only after sufficient air is evacuated from the container which may be sensed, for example, by a timer, a pressure sensor (e.g., measuring the pressure within the container, within a gas reservoir, etc.), a flow sensor, a deformation of the container, etc. In this case, intermediate operation 124 may comprise a determination of the deflation of the container by, for example, any of the mentioned methods. Further, other operations in the disclosed method may also contain various sensed or inferred data, in which case additional intermediate operations may be included to gate progression from one operation to the next. In some embodiments, operations may not proceed linearly from one to the other, or may be of different order. For example, operation 125 may be engaged while operation 123 is ongoing, in order to cause an earlier descent of the container. At operation 126, the controller may halt the rotation of the drum spool so as to halt the descent of the container, based on a measurement or inference that the container has descended to a designated height (which may be determined by, e.g., a timer, position sensor, rpm sensor, pressure sensor, etc.).

At operation 127, the controller may lock the drum spool, which may be achieved by blocking the drum spool, the motor, associated gears, etc. The controller may maintain the drum spool in a locked state while an air pump is engaged, at operation 128 to fill the container with a gas. In some embodiments, the gas may be stored at sufficient pressure that the container may be filled by opening a valve rather than by operating the pump. At operation 129, the controller detects that the container is sufficiently filled with gas, based on, for example, a timer or a pressure sensor, and an air valve is closed. Some embodiments may rely on the operation of a pump rather than the air valve. At operation 130, the controller may unlock a drum spool in order to allow the container to ascend and that ascent may, in turn, rotate the drum spool so as to ultimately generate energy. In conjunction with unlocking the drum spool, the controller may initiate a timer, compare a height of the container to a pre-determined threshold, or otherwise sense or infer whether the container has reached a desired height, and may, for example, indicate an error state if the controller fails to confirm the container has reached the desired height. At operation 131, in response to the container reaching the desired height, the controller may lock the drum spool to avoid further ascent. Some embodiments, such as those with an a cable hose of sufficient length and strength, may omit this operation and rely on, for example, a cable tether of the cable hose to limit the ascent of the container. Alternatively, various operations may be completed without the use of a controller, for example, by timing, gearing, or manual control. The controller, as well as other devices, may be powered through the use of an electric or other generator powered by the system, or otherwise.

In some instances, the container may rise along a guide rod (e.g., via a guide rod wheel adhered to the container, and captured between two guide rods) so that the controller may presume that the distance of released cable hose relates directly to the height of the container rather than, for example, drifting in an ocean current in another direction. Any of the operations of the disclosed method may be performed with energy generated and/or stored based on the ascent of a container which causes a drum spool to rotate, which may be the same container raised and lowered by the method, and/or another container, such as a second container which may be synchronized with the first container and ascend during the descent of the first container.

Operation of the Invention

In operation, embodiments of the invention may include an electrical energy generating device having at least one, but preferably at least two or more drum spools with each drum spool having an, impervious to leakage, and made of non stretching, but flexible material, inflatable energy bladder attached to each drum spool via at least one, but preferably more than one, impervious to leakage, non stretching air hose(s), that uses Archimedes Principle acting upon the device's inflated air bladder having its locking mechanism disengaged, allowing the inflated bladder to rise in the water held in a container, a structure built for the purpose of containing the device's water, or in open water such as a lake. Where the water is held in a container or structure, that structure may be sealed so as to prevent evaporation of the water held within and with the air pumped out of the container or structure so as to create a vacuum and minimize air pressure within the container or structure. Where there is air in the container or structure containing water, that air may be heated so as to prevent the water from freezing in colder climates.

The force of the inflated and rising energy bladder generated by Archimedes Principle causes the device's inflated, unlocked and rising in the water, energy bladder (energy bladder A) to pull its cable air hoses, which are wound around and connected to its drum spool, upward and unwind from its drum spool. The drum spool is connected by gearing to an electric power generator rotor that causes the rotor to rotate around its stator, generating electricity, as the drum spool turns because of the upward force of the rising, inflated energy bladder in the water being sufficient to power the electrical generator.

The unwinding of the drum spool is with sufficient force as a result of the size of its inflated energy bladder being relative to optimally turn the electric generator's rotor to cause the device to create electricity. A portion of the amount of electrical energy generated is used to put enough of a charge in an electric storage battery to power the device's motors to lock and unlock the drum spool, power to open and close the air pump air valve, power the air pump to inflate and deflate the energy bladder, turn the drum spool in order to rewind an unwound air hose back upon its drum spool, returning the deflated energy bladder to its starting point in the process, lock the deflated energy bladder at its starting point, inflate the energy bladder and then unlock the energy bladder's drum spool in order to allow the inflated energy bladder to rise in the water according to Archimedes Principle and repeat the cycle. Once an energy bladder has reached its optimal rise in the water the pump's air valve is opened by a motor triggered by the device's electronic controller's timer and the pump begins to deflate the bladder. Deflation of that energy bladder is aided greatly by water pressure upon the inflated energy bladder from water displaced by the energy bladder according to Archimedes Principle as well.

The air from the deflated bladder initially escapes into its air reservoir when the pump's air valve is opened and the inflated energy bladder is subjected to force according to Archimedes Principle and then the inflated energy bladder's air is pumped into an separate air reservoir or stored within the drum spool's, hermetically sealed, drum, the interior of which is sufficient of sufficient volume capacity to store the air from the deflated energy bladder, in which case the drum spool needs a valve and motor. Pumping the bladder's air into a reservoir for storage and from the reservoir back into the bladder when it is time to inflate the energy bladder creates much less noise pollution than if one were to simply pump the bladder's air out into the atmosphere and back into the deflated bladder from the atmosphere because the pump can be contained in a sound proof housing. Using air reservoirs also allows for reusing the same air when in an airless or minimal air environment such as on the moon. In accordance with Archimedes Principle, it takes less energy to deflate the energy bladder than it does to inflate the energy bladder once it has been locked into its start position. For this reason the air from the deflating energy bladder is compressed into its reservoir in order that the stored energy of the compressed air in the reservoir adds energy to the force necessary to re-inflate the energy bladder.

With the energy bladder now deflated, the energy bladder air hose, with its deflated energy bladder, is fairly easily wound up upon the, hermetically sealed, drum of its drum spool, anchored at the bottom of the water filled container, structure or etc. as the drum spool's gearing is powered in reverse by the drum spool's electrical motor in accordance with Archimedes Principle because the amount of water displaced by the deflated bladder is a fraction of the amount of water the energy bladder displaced with the energy bladder inflated, its drum spool unlocked and the energy bladder rising in rising in the water. Drum gearing to the electric generator's rotor freewheels and doesn't power the generator's rotor when the gearing is powered in reverse and the drum spool is being rotated in reverse so as to rewind the air hose and retract the deflated energy bladder to its starting point. This allows for a second energy bladder's, energy bladder B's, rise in the water to power its gearing to power the same electric generator's rotor in the same direction as the first inflated energy bladder when the first energy bladder is in its rising mode as a result of that energy bladder's gearing also having freewheel gears.

With energy bladder A's air hose rewound and the deflated energy bladder back to its starting point, the device's electronic controller signals a drum spool lock motor to engage the device's first energy bladder's drum spool lock so that the drum cannot unwind as energy bladder A is being, once again, optimally inflated. The electronic controller then signals the device's electric air pump motor to re-inflate the energy bladder to its optimum inflated size. Once the bladder is optimally inflated the electronic controller signals the pump motor to shut down and close its air valve and then the drum spool lock motor to unlock the drum spool allowing the, now inflated, first energy bladder's rise in the water to power the electric generator to create electricity in the process and repeat the cycle.

The same electric generator's stator is connected by gearing to a second energy bladder's, energy bladder B's, drum spool's gearing. When energy bladder B has its drum spool unlocked the inflated that energy bladder rises in the water according to Archimedes Principle and turns the air hose drum spool as the bladder's air hose is unwound. The drum spool's gearing powers the same stator of the electric generator that energy bladder A powered when it was in its rising mode. Energy bladder B is unlocked and begins its rise in the water at the same time as energy bladder A reaches its optimum rise in the water and begins to be reset and vice versa. When energy bladder B is being reset and having its air hose rewound back upon its drum spool, the gearing powering the energy bladder A's drum spool to the device's common stator of the electric generator freewheels and vice versa as well.

The time it takes to reset the first energy bladder should equal the time it takes for the second energy bladder to rise in the water and vice versa in order to produce a consistent flow of electricity beyond the amount of energy it takes to power the generator to create electricity for resetting the energy bladder. The two energy bladders can be timed to ensure that there is a consistent amount of electrical energy generated for sale to the grid all the time. The amount of energy in excess of the amount of energy it takes to make the device work, which should be quite substantial, is then sold to the grid, directly to corporations and individual residences through the grid or directly to customers that lease the device, have it on their property and are charged a product, delivery and set up charge and are then charged by the amount of electricity that is consumed and not grounded out.

The amount of energy the device will put out to power its electric generator is determined by several factors including the size of the optimally inflated energy bladder, the distance the inflated energy bladder travels as it rises to the end of its rise in the water, how much water the rising energy bladder displaces in total, the speed at which the energy bladder travels, the amount of turbulence in the water, if any, conflicting forces, such as tidal forces, if any, and the depth in the water at the energy bladder's starting point. As a rule of thumb, the greater the distance the inflated energy bladder rises in a given period of time and the greater the efficiency of the resetting of the energy bladders and the electrical generators, the more energy in excess of what is needed to cause the device to be reset and power the generator is generated.

If one wants to reset the device's energy bladders or energy drums for a continuous cycle of electrical energy production without using electric battery powered motors, except for a small battery that is charged by the device's generator that is used to power the electronic controller and motors that open and close the pump's air valve, and still generate energy to sell to the grid, the energy bladder or energy drum spool's gearing can be configured so that all the functions that are performed by electric motors, including inflating and deflating energy bladders, rewinding air hoses and locking and unlocking drum spool locks etc., can be powered mechanically with one rising energy bladder or energy drum directly powering the resetting of the opposite energy bladder or energy drum and vice versa, with the energy produced in excess of that required for resetting the energy bladders or energy drums and power the electric generator, creating electricity that can be sold.

If one wants to neither reset energy bladders using electric power nor generate electricity for sale to the grid or other purposes, the device may power gearing to provide mechanical energy beyond that required for resetting the device for whatever purposes deemed appropriate, such as pumping vast amounts of water and lifting that water using the Archimedes Screw, or other means, from one location to another, conveying large amounts of anything from one location to another or filling compressed air reservoirs so that the energy stored in the compressed air reservoirs can be released to power compressed air vehicles, etc. some greater distance from where the device is generating mechanical energy.

The device may be either of the flexible energy bladder types, the material of which does not expand like a rubber balloon but fills with air to create the bladder's optimal shape, or of the energy drum types where an optimally hydrodynamically designed, energy drum that can be flooded with water for rewinding when resetting and have its drum filled with compressed air when the energy drum is locked into position at its starting point, blowing the water from the drum like a submarine blows its ballast tanks when the submersible craft's captain wants to surface, prior to its drum spool lock being unlocked in order to allow the energy drum to rise in the water according to Archimedes Principle and generate energy by the unwinding of its air hose and turning of its air hose drum spool, thereby powering its gearing in the process.

If air from the air filled drum is exhausted into the water as opposed to a reservoir and air to fill the energy drum is pumped from the atmosphere instead of an air reservoir an extra benefit of the device is that it aerates the surrounding water which benefits the nearby underwater flora and fauna by putting more air in the water. The bottom part of the energy bladder/drum near where the air hose connects to the energy bladder/drum may be connected to a guide rod wheel axle the wheels of which fit within two vertical guide tracks having their positions secured by cables and/or underwater supporting structure to allow the energy bladder/drum to rise and descend perfectly vertically in spite of turbulence or other forces in the water allowing the device to propel a vessel.

The energy bladder air hose drum spool and the energy drum air hose and electric power cable hose drum spool, have hose guides, similar to using one thumb on the spool of a fishing bait casting reel to keep the fishing line evenly diffused on the spool drum in lieu of a casting reel with a line guide system, to wind the air and power cable hoses evenly on the drum spool and prevent tangling. Where used in lieu of a main electric storage battery, the mechanical energy storage system's cables have a similar cable guide as well.

The device, in many of the embodiments of the invention, can also be manually reset mechanically by a hand crank, etc. for periodic maintenance and repair if necessary.

Mechanical Energy Storage System

In lieu of an electric storage battery, and using a less powerful electric generator, a portion of the force generated by the inflated and rising energy bladder can be used to power the device's simple, mechanical energy storage system. Embodiments of the simple mechanical energy storage system may include an, optimally designed, concrete weight, relative in size to the amount of energy to be stored, and having cable connection D rings optimally attached at the top of the weight having cables attached that attach to a master cable. The master cable is run through a pulley secured in a safe, out of the way, location centered at one side of the BFES structure's service corridor's top, and back down to its cable drum spool and secured. One of the weight cable drum spool's flanges serves as the system's ratchet wheel because of having ratchet gear teeth that correspond to the pawl of the energy storage system's pawl and the opposite drum spool's flange has gear teeth that correspond to the gearing powering the system's electric generator that delivers electrical energy to the device's electronic controller and resetting motors.

Those motors, once the inflated energy bladder reaches its optimum rise in the water, power some embodiments in this order: the opening of the pump's air valve, the powering of the pump to deflate the energy bladder, the powering of the air hose drum spool to wind the air hose back onto the drum spool and return of the energy bladder to its start position, the turning off of the drum spool motor and the locking of the drum spool with the energy bladder in its start position, the powering of the pump to inflate the energy bladder and the turning off of the air pump, closing of the pump's air valve and the unlocking of the air hose drum spool once the energy bladder is optimally inflated, as determined by the controller's air pressure sensor or an electric timer, to rise in the water and repeat the cycle.

The device, when using a simple mechanical energy storage system in lieu of its electrical storage battery and a more powerful electrical generator, includes the alternate energy storage system's necessary gearing, configured to achieve the intended purposes at the intended times. The gearing from the device's mechanical energy storage device to the energy bladder's air hose drum spool uses freewheels to allow the energy storage device to release mechanical energy, once triggered by the system's weight container hitting a pawl disengage and lock lever as the weight, lifted by the force of the rising bladder when the weight reaches its optimal rise to its pulley. The lever disengages the cable drum spool's, spring operated, pawl from its drum spool ratchet wheel and locks the pawl in its disengaged position, allowing the cable drum to freely turn independent of the rotation, or lack thereof, of the air hose drum spool because of its freewheel. That freewheel only engages to raise the weight when the air hose drum spool is unwinding as a result of the rising of the air hose drum spool's inflated energy bladder in the water. Another lever at the opposite side of the bladder triggers gearing that opens the pumps air intake valve, allowing the force from the water displaced by the inflated energy bladder to act upon the bladder and force air through the pumps open intake valve and out of the bladder causing the bladder to begin to deflate. When the weight of the water displaced by the deflating energy bladder is sufficiently less than the weight of the mechanical energy storage system's weight the weight, in accordance with Archimedes Principle, begins to descend.

As the weight begins to be pulled back down by the force of gravity it hits the pawl disengage and lock lever again and moves the lever in the opposite direction, causing the pawl's lock to be unlocked and allowing the spring powered pawl to once again, make contact with the gear teeth of the ratchet wheel, but only the back of the ratchet's gear teeth so as to not to engage the pawl with the ratchet wheel's gear teeth. With the weight descending the gearing of the mechanical energy storage system is powered to power the system's electric generator to be powered which in turn provides power to the system's electric controller which turns on the appropriate motors, that are powered by the electric generator powered by the force of the descending weight, at the correct time to power their respective functions in a timely manner to, for some embodiments, in this order: power the pump to deflate the energy bladder; power the drum spool rotation motor to wind the air hose back onto the drum spool and return the energy bladder to its start position; power to turn off the drum spool rotation motor, the gearing of which freewheels when the drum spool is unwinding; powering the locking of the air hose drum spool when the energy bladder in its start position; power the pump to inflate the energy bladder; power to turn off the air pump and close the pump's air valve and power the unlocking of the air hose drum spool once the energy bladder is properly inflated, as determined by the controller's air pressure sensor or a timer, to repeat the cycle.

The freewheel gears relative to the electric generator powering gearing power the electric generator rotor gear when the energy bladder is rising and freewheel relative to the electric generator's rotor gear when the energy bladder's air hose is being rewound on its drum spool. The freewheel gears, located within the drum spool rotation motors, relative to the drum spool rotation gearing power the drum spool rotation gearing to rewind unwound air and electric power hoses and freewheel when the hose is being unwound as its energy bladder rises in the water after being unlocked.

NOTE #1: Where more than one energy bladder, and with the single energy bladder (or energy drum) storing its resetting energy in an electric battery, compressed air tank or gravity weight mechanical energy storage system, is used the opposite energy bladders of a two or more energy bladder BFES are of equal dimensions and volume capacities when inflated with air. The opposite energy drums are of equal dimensions and volumes as well.

NOTE #2: Although many types of gearing configurations would be optimal configurations depending upon the type of BFES being described, the basic configuration shown is illustrative of the invention's basic working principle. Although the BFES being described is not drawn to scale, the size of the gears and their ratios are to be considered optimal for the type of BFES functions the particular gear configurations serve. Fasteners holding gears to shafts and shaft supports, except the air release valve motor gear shaft, and gear teeth are not shown in any views. Electric motor drive shafts are shown but not indicated in any of the views.

NOTE #3: The BFES pump air system, including its air reservoir/compressed air tank is airtight and waterproof while allowing all functions of the device's apparatuses to perform optimally. Seals are not shown in any of the views.

NOTE #4: Although not necessarily shown so, all perpendicular gears are to be considered to engage optimally so as to have the desired effect at the correct time.

NOTE #5 To compensate for the variation in speed at which an unlocked energy bladder or energy drum ascends the generator stator gear may also be powered by a variable speed transmission rather than directly by the gearing of the particular, ascending energy bladder or energy drum. The variable speed transmission is not shown in any views.

NOTE #6: The direction of gear turning is indicated by an oval with an arrow point.

NOTE #7 The inflated energy bladder and the energy drum are optimally hydrodynamically shaped but this is not shown in any of the views.

NOTE #8: The next direction an inflated energy bladder will travel is indicated by an arrow.

NOTE #9: The structure's water tight doors along the sides of the water compartment for setting up the BFES in the water compartment before flooding and for, after draining, servicing the BFES apparatuses within the compartment are not shown in any of the views. The doors may open to the inside of the water compartment in order to use the water pressure inside the water compartment to help keep the doors closed tightly.

NOTE #10: The water and service compartments' supporting bracketing and gearing shaft supports and hubs are optimally set up and secured within their respective compartment but these are not shown in any of the views.

NOTE #11: The structure may have catwalks above the water compartment and the gear rows may be on bracketing above the waterline in lieu of a service level with hatch doors to service the device's water compartment apparatuses from a second story or roof of the BFES structure but these and corridor doors are not shown in any of the views. In the Great Lakes of the USA, off the Atlantic, Pacific, or Gulf of Mexico Seaboard, etc. the open water BFES may consist of fields of the devices and those fields may be stacked vertically with the deeper energy drums, etc. made strong enough to operate at greater depths and those depths correspondingly greater pressures.

NOTE #12: Blinking lights and fish feeding systems to attract wild fish to an open water BFES for the purposes of herding fish in the wild from one BFES to another BFES by timing the turning on of the blinking lights with the delivery of fish food are not shown in any of the views. The device may have a bridge, etc. to for a crew to drive the BFES vessel, above or below the water's surface, to its desired destination as well as quarters, etc. but these are not shown in the FIG. 16 view. Power cables to the electric power grid, etc. are not shown in any of the views as well. The BFES buoy of FIG. 16 is self-propelled and winchable.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents. Changes and modifications to the described embodiments can be made in accordance with ordinary skill in the art without departing from the technology in its broader aspects as defined in the following claims.

What is claimed is:

1. An energy-generating apparatus comprising:

(A) a container configured to be fully submerged in a liquid with different volumes of a gas such that, (i) when the container is in a first state, the container ascends in the liquid and, (ii) when the container is in a second state, the container descends in the liquid;

(B) a drum spool with a cable hose that is secured to the drum spool at a first end and to the container at a second end, the cable hose being in fluid communication with the container, and configured to unwind from the drum spool as the container ascends in the liquid, such that a length of the cable hose wrapped around the drum spool is configured to decrease during the ascent of the container;

(C) a fluid transfer mechanism coupled to the container and configured to transfer the gas into or out of the container to change the container between the first and second states;

(D) a power generator coupled to the drum spool and configured to transfer or convert energy from a rotation of the drum spool; and (E) an electronic controller coupled to the fluid transfer mechanism and the drum spool, the electronic controller configured to:

(i) transfer the gas into the container, via the cable hose, to bring the container to the first state in which the container ascends in the liquid and unwinds the cable hose from the drum spool to generate power via the power generator; and (ii) transfer the gas out of the container, via the cable hose, to bring the container to the second state in which the container descends in the liquid.

2. The energy-generating apparatus of claim 1, wherein the electronic controller is further configured to, following ascension of the container in the liquid, transfer the gas out of the container to bring the container to the second state such that the container descends in the liquid.

3. The energy-generating apparatus of claim 1, wherein the electronic controller is further configured to:

(A) lock the drum spool so as to restrict the rotation of the drum spool; and (B) unlock the drum spool to allow the container to ascend in the liquid and thereby rotate the drum spool.

4. The energy-generating apparatus of claim 3, wherein the electronic controller is further configured to rotate the drum spool to rewind the cable hose, and relock the drum spool.

5. The energy-generating apparatus of claim 1, wherein the power generator is an electrical power generator configured to generate electricity from the rotation of the drum spool.

6. The energy-generating apparatus of claim 5, further comprising an electrical battery for storage of at least a fraction of the electricity generated via the power generator, wherein the electrical battery is configured to power at least one of the electronic controller or the fluid transfer mechanism.

7. The energy-generating apparatus of claim 1, wherein:

the container is an energy bladder configured to be inflated to bring the container to the first state, and deflated to bring the container to the second state; and wherein the container is deflated by a water pressure enveloping the container.

8. The energy-generating apparatus of claim 1, wherein the container is an energy drum configured to be injected with the gas to bring the energy drum to the first state, and flooded with the liquid to bring the energy drum to the second state.

9. The energy-generating apparatus of claim 1, wherein the fluid transfer mechanism transfers the gas into the container using a pump.

10. The energy-generating apparatus of claim 1, wherein the fluid transfer mechanism transfers the gas into or out of the container via the cable hose.

11. The energy-generating apparatus of claim 1, wherein the container is a first container, and wherein the apparatus further comprises a second container configured to be submerged in the liquid.

12. An energy-generating method comprising:

(A) submerging, in a liquid, a container that is configured to contain different volumes of a gas such that, (i) when the container is in a first state, a liquid density corresponding to the liquid is greater than a container density corresponding to the container, and (ii) when the container is in a second state, the liquid density is less than the container density;

(B) a cable hose that is in fluid communication with the container, wherein the cable hose is configured to unwind from a drum spool and rotate the drum spool as the container ascends in the liquid when the container is in the first state;

(C) transferring, via the cable hose, the gas into the container to bring the container to the first state in which the container ascends in the liquid; and (D) unwinding the drum spool, as the container ascends in the liquid and thereby rotates the drum spool to generate electricity via an electrical power generator coupled to the drum spool, wherein the unwinding reduces a length of the cable hose wrapped around the drum spool.

13. The energy-generating method of claim 12, further comprising, following ascension of the container in the liquid, transferring the gas out of the container to bring the container to the second state such that the container descends in the liquid.

14. The method of claim 12 further comprising:

locking the drum spool so as to restrict a rotation of the drum spool; and unlocking the drum spool to allow the rotation of the drum spool, to allow the container to ascend in the liquid.

15. The energy-generating method of claim 14, further comprising rotating the drum spool to wind the cable hose, and relocking the drum spool.

16. The energy-generating method of claim 12, wherein the container is an energy bladder configured to be inflated to bring the container to the first state, and deflated to bring the container to the second state.

17. The energy-generating method of claim 12, wherein the container is an energy drum configured to be injected with the gas to bring the energy drum to the first state, and flooded with the liquid to bring the energy drum to the second state.

18. The energy-generating method of claim 12, wherein the container is submerged in an open water.

19. An electronic controller for an energy-generating apparatus, wherein the electronic controller is configured to:

(A) activate a locking mechanism to lock a drum spool and thereby restrict rotation of the drum spool to fix a length of the cable hose wrapped around the drum spool, wherein the drum spool is secured to a first end of a cable hose, the cable hose comprising a second end fluidly connected to a container that is fully submerged in a liquid and that is configured to contain different volumes of a gas such that, (i) when the container is in a first state, a liquid density corresponding to the liquid is greater than a container density corresponding to the container, and (ii) when the container is in a second state, the liquid density is less than the container density; and (B) use a fluid transfer mechanism to transfer the gas, via the cable hose, into the container to bring the container to the first state in which the container ascends in the liquid; and (C) deactivate the locking mechanism to unlock the drum spool to adjust a length of the cable hose wrapped around the drum spool to allow the container to ascend in the liquid and unwind the cable hose from the drum spool to thereby generate electricity via an electrical power generator coupled to the drum spool.

20. The electronic controller of claim 19, wherein the controller is further configured to, following ascension of the container in the liquid, engage the fluid transfer mechanism to transfer the gas out of the container to bring the container to the second state such that the container descends in the liquid.

21. The electronic controller of claim 19, wherein the electronic controller is further configured to rotate the drum spool to rewind the cable hose, and activate the locking mechanism to relock the drum spool.

* * * * *